United States Patent
Sakamoto et al.

(10) Patent No.: US 11,036,871 B2
(45) Date of Patent: Jun. 15, 2021

(54) PON SYSTEM, WIRELESS NETWORK SYSTEM, DATA TRANSFER METHOD, OLT, AND ONU

(71) Applicant: NIPPON TELEGRAPH AND TELEPHONE CORPORATION, Tokyo (JP)

(72) Inventors: Takeshi Sakamoto, Tokyo (JP); Kenji Kawai, Tokyo (JP); Junichi Kato, Tokyo (JP); Kazuhiko Terada, Tokyo (JP); Hiroyuki Uzawa, Tokyo (JP); Nobuyuki Tanaka, Tokyo (JP); Tomoaki Kawamura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 308 days.

(21) Appl. No.: 16/332,777

(22) PCT Filed: Sep. 13, 2017

(86) PCT No.: PCT/JP2017/033020
§ 371 (c)(1),
(2) Date: Mar. 12, 2019

(87) PCT Pub. No.: WO2018/052016
PCT Pub. Date: Mar. 22, 2018

(65) Prior Publication Data
US 2019/0213334 A1 Jul. 11, 2019

(30) Foreign Application Priority Data
Sep. 13, 2016 (JP) .............................. JP2016-178232

(51) Int. Cl.
*G06F 21/60* (2013.01)
*H04L 12/44* (2006.01)
(Continued)

(52) U.S. Cl.
CPC ........... *G06F 21/602* (2013.01); *H04B 10/11* (2013.01); *H04B 10/25754* (2013.01); *H04B 10/27* (2013.01); *H04L 12/44* (2013.01)

(58) Field of Classification Search
CPC . G06F 21/602; H04B 10/11; H04B 10/25754; H04B 10/27; H04L 12/44
(Continued)

(56) References Cited

U.S. PATENT DOCUMENTS

| 2007/0098155 A1* | 5/2007 | Nagasawa | ............. H04L 9/0637 380/33 |
| 2015/0222429 A1* | 8/2015 | Vilella | ................. H04B 10/272 380/256 |

(Continued)

FOREIGN PATENT DOCUMENTS

| CN | 103220266 A | 7/2013 |
| JP | 2009-171424 A | 7/2009 |

OTHER PUBLICATIONS

Taoka et al., "MIMO and Coordinated Multi-point transmission/reception in LTEAdvanced", NTT DOCOMO Technica Journal, vol. 12, No. 2, 2010, pp. 20-28.
(Continued)

*Primary Examiner* — Dalzid E Singh
(74) *Attorney, Agent, or Firm* — Womble Bond Dickinson (US) LLP

(57) ABSTRACT

An OLT (10) is provided with a priority control bypass circuit (16) and an encryption/decryption bypass circuit (17), or an ONU (20) is provided with a priority control bypass circuit (26) and an encryption/decryption bypass circuit (27), and one or both of encryption/decryption processing and priority control processing are bypassed in accordance with a priority control bypass instruction (BP) and an encryption/decryption bypass instruction (BE), which are set in advance. This reduces a processing delay that occurs in the OLT or the ONU.

20 Claims, 18 Drawing Sheets

(51) Int. Cl.
 H04B 10/2575 (2013.01)
 H04B 10/11 (2013.01)
 H04B 10/27 (2013.01)
(58) Field of Classification Search
 USPC .......................................................... 380/256
 See application file for complete search history.

(56) References Cited

U.S. PATENT DOCUMENTS

2015/0381313 A1* 12/2015 Khotimsky ........... H04L 1/0041
 714/776
2019/0281587 A1* 9/2019 Zhang .................. H04L 5/0044

OTHER PUBLICATIONS

Office Action received for Japanese Patent Application No. 2018-539745, dated May 28, 2019, 4 pages (2 pages of English Translation and 2 pages of Office Action).

Matsunaga et al., "Radio Access Network Architecture Evolution toward 5G", Technical Report of IEICE, RCS2014-172, Oct. 2014, 11 pages (5 pages of English Translation and 6 pages of Original Document).

Kenji et al., "A Study on Optical Transmission Bandwidth for Future Mobile Fronthaul Based on PON System", IEICE Technical Report, Institute of Electronics, Information and Communication Engineers, vol. 114, No. 119, 2014, 14 pages (8 pages of English Translation and 6 pages of Original Document).

International Search Report and Written Opinion received for PCT Patent Application No. PCT/JP2017/033020, dated Dec. 19, 2017, 10 pages (5 pages of English Translation and 5 pages of Original Document).

International Preliminary Report on Patentability received for PCT Patent Application No. PCT/JP2017/033020, dated Mar. 28, 2019, 10 pages (6 pages of English Translation and 4 pages of Original Document).

China Mobile Research Institute et al., "White Paper of a Next Generation Fronthaul Interface", Version 1.0, Jun. 4, 2015, pp. 1-39.

3rd Generation Partnership Project, "Technical Specification Group Radio Access Network, Evolved Universal Terrestrial Radio Access (E-UTRA), Physical layer procedures," Release 8, 3GPP, TS 36.213, V8.2.0, Mar. 2008, 30 pages.

* cited by examiner

PON SYSTEM, WIRELESS NETWORK SYSTEM, DATA TRANSFER METHOD, OLT, AND ONU

TECHNICAL FIELD

The present invention relates to a data transfer technique of reducing a processing delay that occurs in an OLT or ONU of a PON (Passive Optical Network).

BACKGROUND ART

In a wireless network system, arranging small cells at a high density to accommodate mobile traffic that rapidly increases has been examined in recent years. Since a small cell has a cell radius smaller than that of a macro cell, the number of user terminals that share the same frequency in a cell is decreased, and throughput per terminal can be improved.

On the other hand, the high-density arrangement of small cells increases the interference power from adjacent cells. For example, in a case in which a plurality of cells transmit data to different user terminals simultaneously using the same frequency band, for each user terminal, transmission signals from cells other than the cell that has transmitted the data for the user terminal itself may become interference power to a desired reception signal and lower the throughput. Hence, in a downlink that requires a particularly high throughput, cooperative transmission of the cell group is needed to suppress interference (non-patent literature 1).

As shown in FIG. 16, the wireless access network system is formed by a plurality of radio stations RRUs (Remote Ratio Units) arranged in each cell, a central station CU (Central Unit) configured to cooperatively control wires transmission/reception of the RRUs, and an MFH (Mobile FrontHaul) that connects the CU and the RRUs by an optical fiber. Accordingly, data for a user terminal UE (User Equipment), which arrives from an MBH (Mobile BackHaul), is transferred from the CU to an RRU via the optical fiber of the MFH and wirelessly transmitted from the RRU to the UE.

RELATED ART LITERATURE

Non-Patent Literature

Non-Patent Literature 1: Taoka et al., "MIMO and Coordinated Multi-point transmission/reception in LTE-Advanced, NTT DOCOMO Technical Journal, Vol. 18, No. 2, July 2010

Non-Patent Literature 2: Matsunaga et al., "Radio Access Network Architecture Evolution toward 5G", Technical Report of IEICE, RCS2014-172, October, 2014

Non-Patent Literature 3: Miyamoto et al., "A Study on Optical Transmission Bandwidth for Future Mobile Fronthaul Based on PON System", Technical Report of IEICE, CS2014-18, 2014

Non-Patent Literature 4: China Mobile Research Institute et al.: "White Paper of Next Generation Fronthaul Interface ver. 1.0", Jun. 4, 2015

Non-Patent Literature 5: 3GPP, TS 36.213 V.8.2.0

DISCLOSURE OF INVENTION

Problem to be Solved by the Invention

Conventionally, the MFH employs a form in which data that is baseband-processed by the CU is transferred to each RRU (non-patent literature 2). However, to economize the MFH, applying, to the MFH, a TDM system such as a TDM-PON (Time Division Multiplexing Passive Optical Network) that forms a so-called Layer2 that moves the baseband processing to the RRU side and implements it by a general-purpose Layer2 (L2 of an OSI reference model) network has been examined (non-patent literatures 3 and 4).

As shown in FIG. 17, wireless protocol processing used in the wireless network system is normally formed by the processes of a PDCP (Packet Data Convergence Protocol) that performs processes such as compression, decompression, and encryption/decryption of a packet header, an RLC (Radio Link Control) that performs processes such as retransmission control, duplication detection, and ordering, MAC (Medium Access Control) that performs processes such as radio resource allocation, data mapping, retransmission control, and priority control, PHY (Physical) that performs processes such as a modulation method, an encoding method, and antenna multiplexing, and RF (Radio Frequency) that performs wireless transmission/reception processing. These processes are divisionally executed by the CU and the RRU.

Various Layer2 forming methods for MFH have been proposed. One of the methods is, for example, a MAC-PHY division method in which processing up to baseband processing is executed by an RRU, and upper protocol processing is executed by a CU. As another Layer2 forming method, there is a PDCP-RLC division method in which not only baseband processing but also processing up to RLC that is a part of the Layer2 processing is executed by an RRU, and upper protocol processing is executed by a CU. Furthermore, there also exists a form that arbitrarily changes these methods (non-patent literatures 4 and 5). Hence, the MFH is required to flexibly cope with various function division methods between the CU and the RRU in an MFH as a Layer2.

As shown in FIG. 18, this arrangement is advantageous as compared to the MFH to which the TDM-PON is not applied because an optical fiber can be shared by a plurality of RRUs. On the other hand, an OLT (Optical Line Terminal) and an ONU (Optical Network Unit), which form the TDM-PON, are inserted in the MFH section. For this reason, a time needed for data transfer processing in the OLT and the ONU is added to the delay that occurs in the MFH section. In particular, since the delay permitted in the MFH section is defined and limited by each wireless network system, the processing delay in the OLT or the ONU needs to be reduced.

The present invention has been made to solve this problem, and has as its object to provide a data transfer technique capable of reducing a processing delay that occurs in an OLT or an ONU.

Means of Solution to the Problem

In order to achieve the above-described object, according to the present invention, there is provided a PON system including one OLT and a plurality of ONUs and configured to transfer data between the OLT and the plurality of ONUs via a PON, wherein at least one PON device of the OLT and the plurality of ONUs comprises an encryption/decryption processing circuit configured to perform encryption/decryption processing for the data, a priority control circuit configured to perform priority control processing for the data, and a bypass circuit configured to bypass at least one of the encryption/decryption processing circuit and the priority control circuit in accordance with a preset bypass instruction.

In addition, according to the present invention, there is provided a data transfer method used by a PON system including one OLT and a plurality of ONUs and configured to transfer data between the OLT and the plurality of ONUs via a PON, wherein at least one PON device of the OLT and the plurality of ONUs comprises an encryption/decryption processing step of performing encryption/decryption processing for the data, a priority control step of performing priority control processing for the data, and a bypass processing step of bypassing at least one of the encryption/decryption processing circuit and the priority control circuit in accordance with a preset bypass instruction.

In addition, according to the present invention, there is provided a wireless network system including one or a plurality of radio stations configured to perform wireless communication with one or a plurality of user terminals accommodated under the radio stations and configured to divisionally execute a plurality of wireless protocol processes between the central station and the radio station, wherein a mobile fronthaul configured to transfer data transmitted/received by the user terminal between the central station and the radio station comprises one of the above-described PON systems.

In addition, a station side device according to the present invention is an OLT used in one of the above-described PON systems.

In addition, a subscriber side device according to the present invention is an ONU used in one of the above-described PON systems.

Effect of the Invention

According to the present invention, the priority control bypass instruction and the encryption/decryption bypass instruction are set in accordance with the position of the division point of wireless protocol processes to be divisionally executed, thereby bypassing encryption/decryption processing and priority control processing in the OLT or the ONU, which are duplicately executed for data transferred by the PON system. It is therefore possible to omit wasteful duplicate processing in the OLT and the ONU and, as a result, reduce the processing delay.

In addition, not only for the mobile fronthaul, when the priority control bypass instruction and the encryption/decryption bypass instruction are set, the processing delay in the OLT and the ONU for the data transferred in the PON system can be reduced.

BEST MODE FOR CARRYING OUT THE INVENTION

The embodiments of the present invention will now be described with reference to the accompanying drawings.

First Embodiment

A wireless network system 1 according to the first embodiment of the present invention will be described first with reference to FIG. 1.

Figure 1:
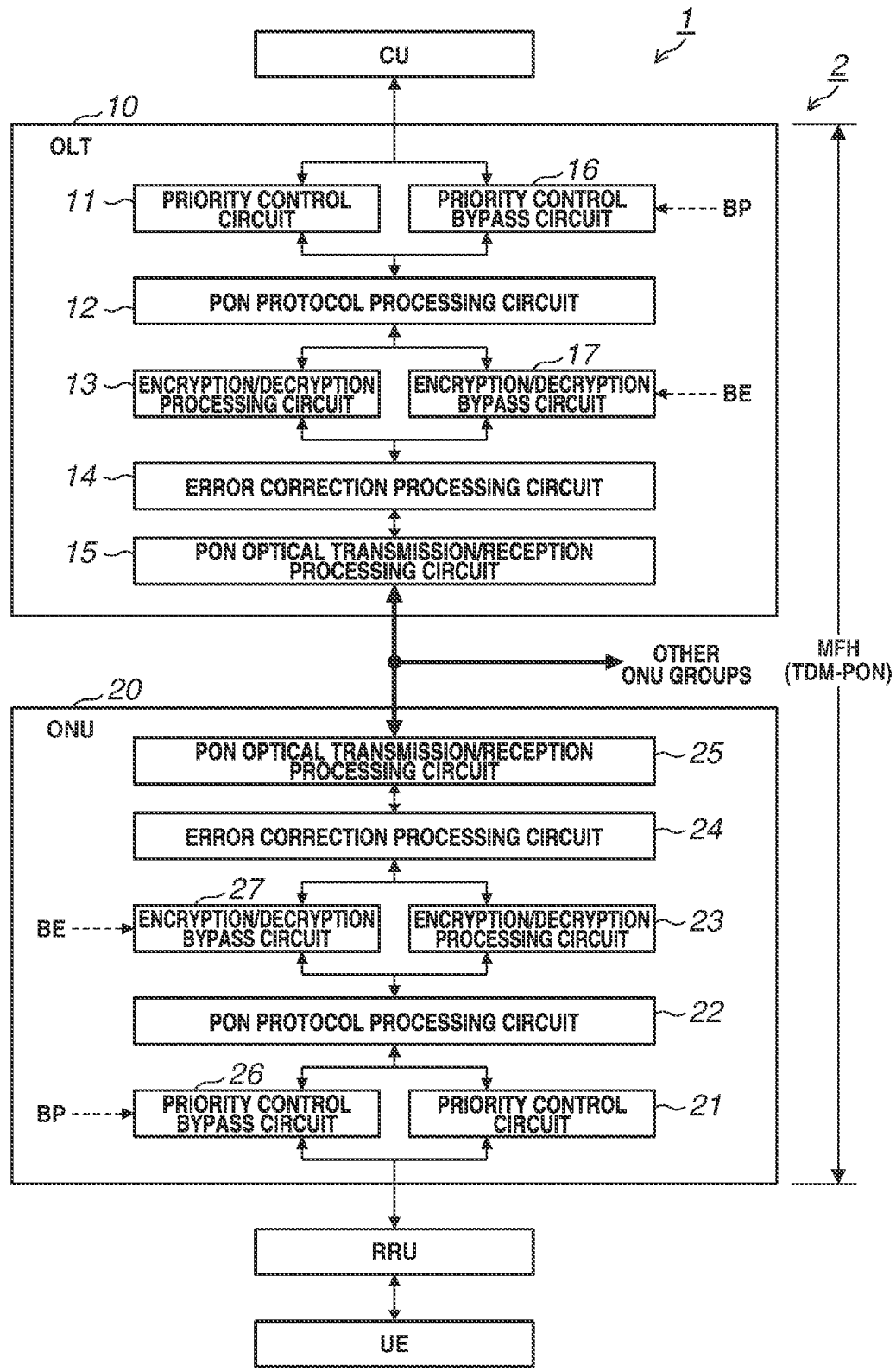
FIG. 1 is a block diagram showing the arrangement of a wireless network system according to the first embodiment.

As shown in FIG. 1, the wireless network system 1 includes one central station CU (Central Unit), one or a plurality of radio stations RRUs (Remote Radio Units) configured to perform wireless communication with one or a plurality of user terminals UE accommodated under the RRUs, and a mobile fronthaul (MFH) that connects the CU and the RRUs.

The wireless network system 1 is a system that causes the CU and the RRU to divisionally execute a plurality of wireless protocol processes, thereby transferring data transmitted/received by the UE via the MFH between the CU and the RRU. In the present invention, a PON system 2 is applied as the MFH.

The PON system 2 is an optical access network system that is formed by one station side device OLT 10 and a plurality of subscriber side devices ONUs 20 each accommodating one or a plurality of RRUs under it, which are PON devices, and time-divisionally transfers data between the OLT 10 and the ONU 20 via the PON formed by an optical fiber.

Additionally, to facilitate understanding, FIG. 1 shows an example in which only one RRU is accommodated under the ONU, and only one UE is connected to the RRU. However, the present invention is not limited to this. In general, an ONU accommodates one or a plurality of RRUs, and one or a plurality of UEs are connected to each RRU.

Note that in the wireless network system 1, each of the CU, the RRU, and the UE has a general known arrangement, and a detailed description thereof will be omitted here.

In addition, the PON system 2 according to the present invention will be described using, as an example, a TDM-PON that is a PON system based on the TDM method. However, the present invention is not limited to this. The present invention can similarly be applied to a PON system based on another method, and a similar effect can be obtained.

In addition, the PON system 2 according to the present invention will be described using, as an example, a case in which the PON system 2 is used as the MFH of the wireless network system 1 that operates based on a wireless protocol process. However, the present invention is not limited to this. For example, even in a case in which arbitrary sections are relay-connected by optical communication in a communication network such as the IoT (Internet of Things) that operates based on an arbitrary communication protocol process, the PON system 2 according to the present invention can also be applied, and a similar effect can be obtained. In these cases, generally, the CU and the RRU correspond to a host device and a home gateway, respectively.

[PON Devices]

The arrangements of the OLT 10 and the ONU 20 according to this embodiment, which are PON devices, will be described next with reference to FIG. 1.

Figure 18:
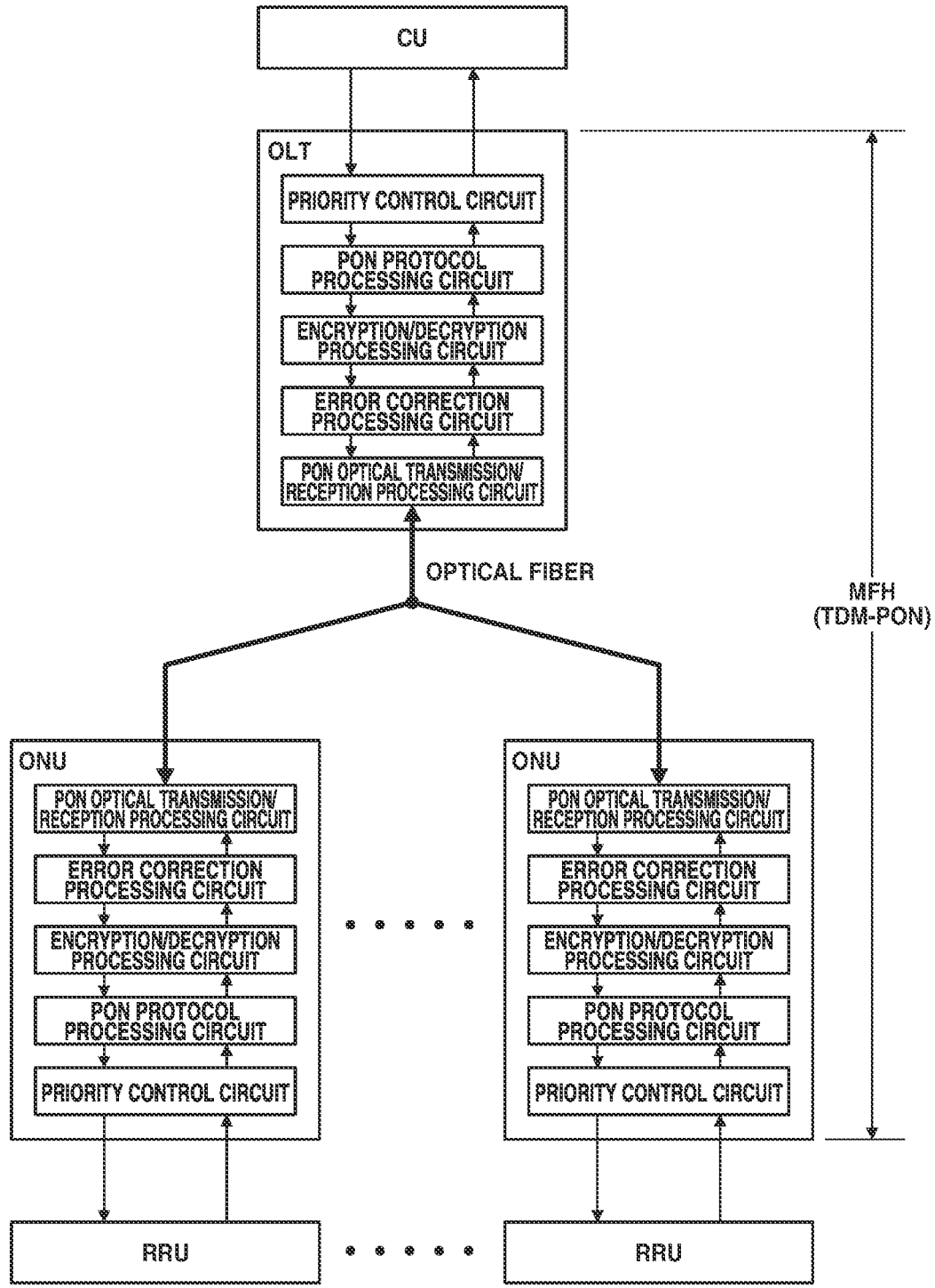
FIG. 18 shows an example of the arrangement of an MFH to which TDM-PON is applied.

The OLT 10 according to this embodiment includes, as main circuit units, not only a priority control circuit 11, a PON protocol processing circuit 12, an encryption/decryption processing circuit 13, an error correction processing circuit 14, and a PON optical transmission/reception processing circuit 15, which have the same arrangement as in FIG. 18 described above, but also a priority control bypass circuit 16 and an encryption/decryption bypass circuit 17 (bypass circuit). These circuit units are formed by one or a plurality of semiconductor chips. Note that some of the functions of the priority control, PON protocol processing, and encryption/decryption processing may be formed by software on a CPU in the OLT.

In addition, the ONU 20 according to this embodiment includes, as main circuit units, not only a priority control circuit 21, a PON protocol processing circuit 22, an encryption/decryption processing circuit 23, an error correction processing circuit 24, and a PON optical transmission/reception processing circuit 25, which have the same arrangement as in FIG. 18 described above, but also a priority control bypass circuit 26 and an encryption/decryption bypass circuit 27 (bypass circuit). These circuit units are formed by one or a plurality of semiconductor chips. Note that some of the functions of the priority control, PON protocol processing, and encryption/decryption processing may be formed by software on a CPU in the ONU.

The priority control bypass circuit 16 has a function of bypassing data to be input to the priority control circuit 11 in accordance with a priority control bypass instruction BP set in advance.

The encryption/decryption bypass circuit 17 has a function of bypassing data to be input to the encryption/decryption processing circuit 13 in accordance with an encryption/decryption bypass instruction BE set in advance.

The priority control bypass circuit 16 and the encryption/decryption bypass circuit 17 perform bypass processing for both downlink data from the CU to the UE and uplink data from the UE to the CU.

The priority control bypass circuit 26 has a function of bypassing data to be input to the priority control circuit 21 in accordance with the priority control bypass instruction BP set in advance.

The encryption/decryption bypass circuit 27 has a function of bypassing data to be input to the encryption/decryption processing circuit 23 in accordance with the encryption/decryption bypass instruction BE set in advance.

The priority control bypass circuit 26 and the encryption/decryption bypass circuit 27 perform bypass processing for both downlink data from the CU to the UE and uplink data from the UE to the CU.

Of these circuit units, the priority control circuit 11 and the priority control circuit 21 are configured to operate as a pair and perform priority control processing for data transferred between the OLT 10 and the ONU 20 via the PON, thereby ensuring communication quality in the PON section.

In addition, the encryption/decryption processing circuit 13 and the encryption/decryption processing circuit 23 are configured to operate as a pair and perform encryption/decryption processing for data transferred between the OLT 10 and the ONU 20 via the PON, thereby ensuring security in the PON section.

Note that each of the PON protocol processing circuit 12, the error correction processing circuit 14, the PON optical transmission/reception processing circuit 15, the PON protocol processing circuit 22, the error correction processing circuit 24, and the PON optical transmission/reception processing circuit 25 has a general known arrangement, and a detailed description thereof will be omitted here.

[Principle of Invention]

Figure 17:
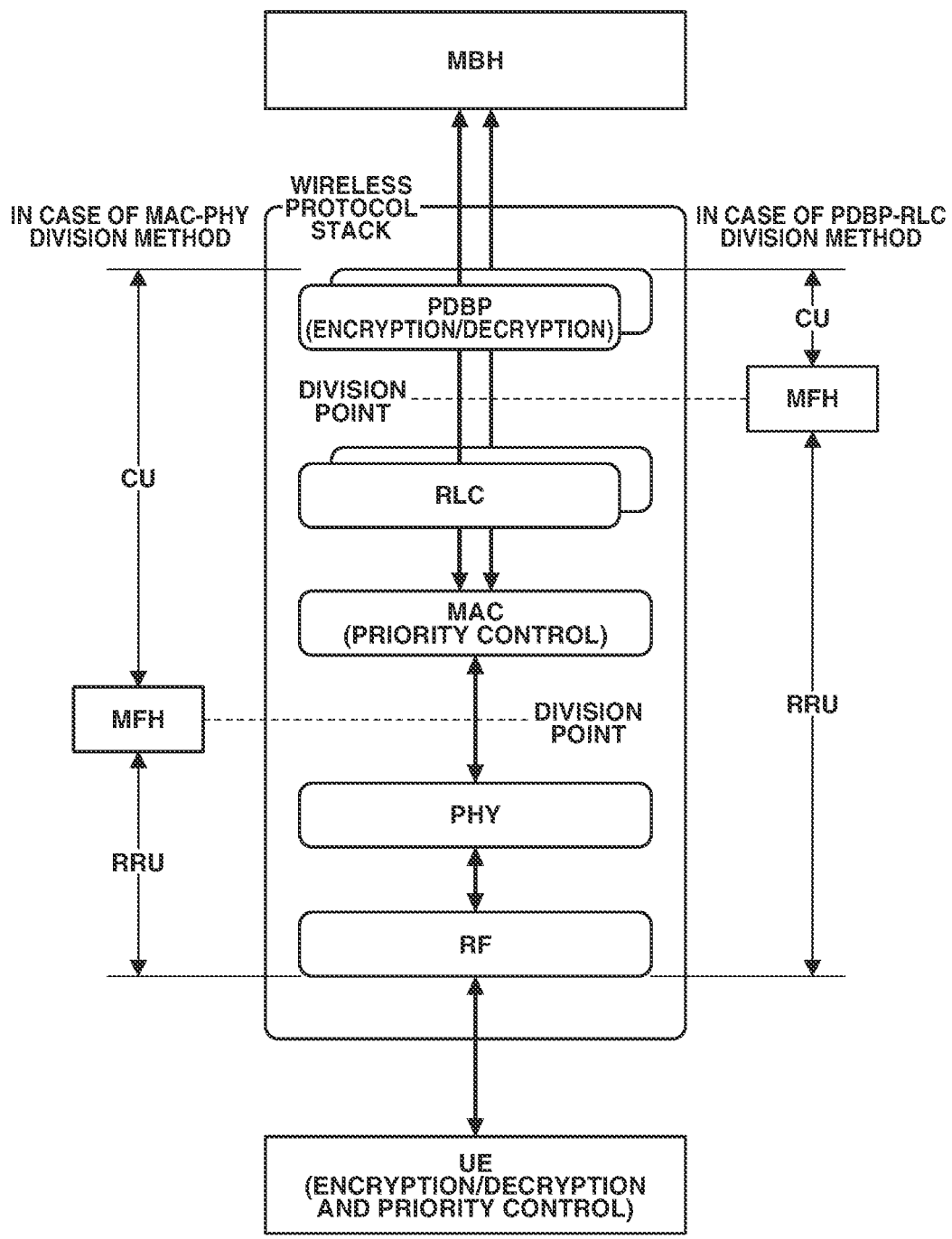
FIG. 17 is an explanatory view showing Layer2 formation of an MFH.

In general, as the wireless protocol processes used in the wireless network system 1, in the PDCP, not only processes such as compression and decompression of a packet header but also encryption/decryption processing is performed, as shown in FIG. 17 described above. The encryption/decryption processing in the PDCP corresponds to encryption/decryption processing executed in the UE, and is performed to ensure security in the path between the PDCP and the UE. Additionally, in the MAC, not only processes such as radio resource allocation, data mapping, and retransmission control but also priority control processing is performed. The priority control processing in the MAC corresponds to priority control processing executed in the UE, and is performed to ensure communication quality in the path between the MAC and the UE.

On the other hand, each of the station side device OLT 10 and the subscriber side device ONU 20, which form the PON system 2 used as the MFH, is provided with an encryption/decryption processing circuit that performs encryption/decryption processing for data transmitted/received via the PON formed by an optical fiber, and a priority control circuit that performs priority control processing for the data, as shown in FIG. 18 described above.

Hence, the encryption/decryption processing and the priority control processing in the OLT 10 and the ONU 20 overlap with the encryption/decryption processing and the priority control processing in the PDCP and the MAC in the wireless protocol processes.

Here, when divisionally executing the wireless protocol processes by the CU and the RRU, as shown in FIG. 17, the division point may be provided between arbitrary processes from the PDCP to the RF, and the MFH is inserted to the division point. Hence, for example, in the MAC-PHY division method, the MFH is inserted between the MAC and the PHY. For this reason, for data transferred by the MFH, encryption/decryption processing and priority control processing in the OLT 10 and the ONU 20 are duplicately executed in the MFH section independently of encryption/decryption processing and priority control processing in the PDCP and the MAC.

Additionally, for example, in the PDCP-RLC division method, the MFH is inserted between the PDCP and the RLC. For this reason, for data transferred by the MFH, encryption/decryption processing in the OLT 10 and the ONU 20 is duplicately executed in the MFH section independently of encryption/decryption processing in the PDCP. Hence, when such processing to be duplicately executed is bypassed in the OLT 10 and the ONU 20, the processing delay in the OLT 10 and the ONU 20 can be reduced.

The present invention focuses on the point that the processing delay in the OLT 10 and the ONU 20 can be reduced by bypassing encryption/decryption processing and priority control processing to be duplicately executed for data transferred by the MFH and the point that these duplicate processes change depending on the position of the division point of the wireless protocol processes. A bypass circuit that bypasses one or both of the encryption/decryption processing and the priority control processing is provided in each of the OLT 10 and the ONU 20, and switching between bypass and non-bypass of the bypass circuit is controlled based on a bypass instruction set in advance in accordance with the division point position of the wireless protocol processes.

[OLT]

The arrangements and operations of the priority control bypass circuit 16 and the encryption/decryption bypass circuit 17 of the OLT 10 according to this embodiment will be described next in detail with reference to FIG. 2.

Figure 2:
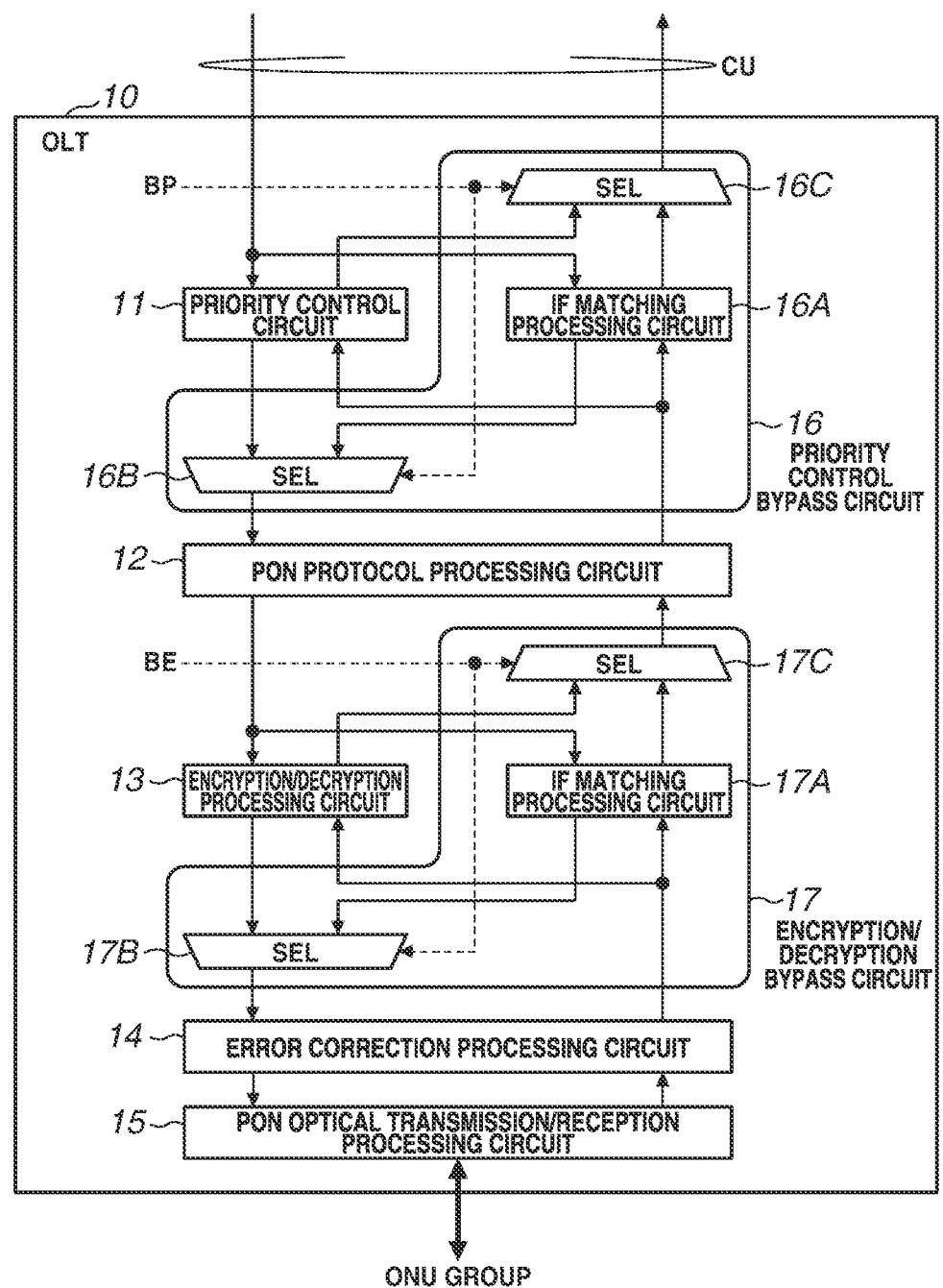
FIG. 2 is a block diagram showing the arrangement of an OLT according to the first embodiment.

As shown in FIG. 2, the priority control bypass circuit 16 includes, as main processing circuits, an IF matching processing circuit 16A and selectors SELs 16B and 16C. In addition, the encryption/decryption bypass circuit 17 includes, as main processing circuits, an IF matching processing circuit 17A and selectors SELs 17B and 17C.

The IF matching processing circuit 16A has a function of receiving downlink input data output from the CU and to be input to the priority control circuit 11 as the target of bypass and matching the interface of a standard, a format, and the like concerning the downlink input data with that of downlink non-bypass data obtained by applying priority control processing to the downlink input data, thereby generating downlink bypass data that has bypassed the priority control processing.

In addition, the IF matching processing circuit 16A has a function of receiving uplink input data output from the PON protocol processing circuit 12 and to be input to the priority control circuit 11 as the target of bypass and matching the interface of a standard, a format, and the like concerning the uplink input data with that of uplink non-bypass data obtained by applying priority control processing to the uplink input data, thereby generating uplink bypass data that has bypassed the priority control processing.

The SEL 16B has a function of switching and selecting one of downlink non-bypass data output from the priority control circuit 11 and downlink bypass data output from the IF matching processing circuit 16A in accordance with the priority control bypass instruction BP and outputting the data to the PON protocol processing circuit 12.

The SEL 16C has a function of switching and selecting one of uplink non-bypass data output from the priority control circuit 11 and uplink bypass data output from the IF matching processing circuit 16A in accordance with the priority control bypass instruction BP and outputting the data to the CU.

Hence, when the priority control bypass instruction BP indicates non-bypass, the downlink non-bypass data output from the priority control circuit 11 is selected by the SEL 16B and output to the PON protocol processing circuit 12, and the uplink non-bypass data output from the priority control circuit 11 is selected by the SEL 16C and output to the CU. On the other hand, when the priority control bypass instruction BP indicates bypass, the downlink bypass data output from the IF matching processing circuit 16A is selected by the SEL 16B and output to the PON protocol processing circuit 12, and the uplink bypass data output from the IF matching processing circuit 16A is selected by the SEL 16C and output to the CU. The priority control processing by the priority control circuit 11 is thus bypassed.

The IF matching processing circuit 17A has a function of receiving downlink input data output from the PON protocol processing circuit 12 and to be input to the encryption/decryption processing circuit 13 as the target of bypass and matching the interface of a standard, a format, and the like concerning the downlink input data with that of downlink non-bypass data obtained by applying encryption/decryption processing to the downlink input data, thereby generating downlink bypass data that has bypassed the encryption/decryption processing.

In addition, the IF matching processing circuit 17A has a function of receiving uplink input data output from the error correction processing circuit 14 and to be input to the encryption/decryption processing circuit 13 as the target of bypass and matching the interface of a standard, a format, and the like concerning the uplink input data with that of uplink non-bypass data obtained by applying encryption/decryption processing to the uplink input data, thereby generating uplink bypass data that has bypassed the encryption/decryption processing.

The SEL 17B has a function of switching and selecting one of downlink non-bypass data output from the encryption/decryption processing circuit 13 and downlink bypass data output from the IF matching processing circuit 17A in accordance with the encryption/decryption bypass instruction BE and outputting the data to the error correction processing circuit 14.

The SEL 17C has a function of switching and selecting one of uplink non-bypass data output from the encryption/decryption processing circuit 13 and uplink bypass data output from the IF matching processing circuit 17A in accordance with the encryption/decryption bypass instruction BE and outputting the data to the PON protocol processing circuit 12.

Hence, when the encryption/decryption bypass instruction BE indicates non-bypass, the downlink non-bypass data output from the encryption/decryption processing circuit 13 is selected by the SEL 17B and output to the error correction processing circuit 14, and the uplink non-bypass data output from the encryption/decryption processing circuit 13 is selected by the SEL 17C and output to the PON protocol processing circuit 12. On the other hand, when the encryption/decryption bypass instruction BE indicates bypass, the downlink bypass data output from the IF matching processing circuit 17A is selected by the SEL 17B and output to the error correction processing circuit 14, and the uplink bypass data output from the IF matching processing circuit 17A is selected by the SEL 16C and output to the PON protocol processing circuit 12. The encryption/decryption processing by the encryption/decryption processing circuit 13 is thus bypassed.

[ONU]

The arrangements and operations of the priority control bypass circuit 26 and the encryption/decryption bypass circuit 27 of the ONU 20 according to this embodiment will be described next in detail with reference to FIG. 3.

Figure 3:
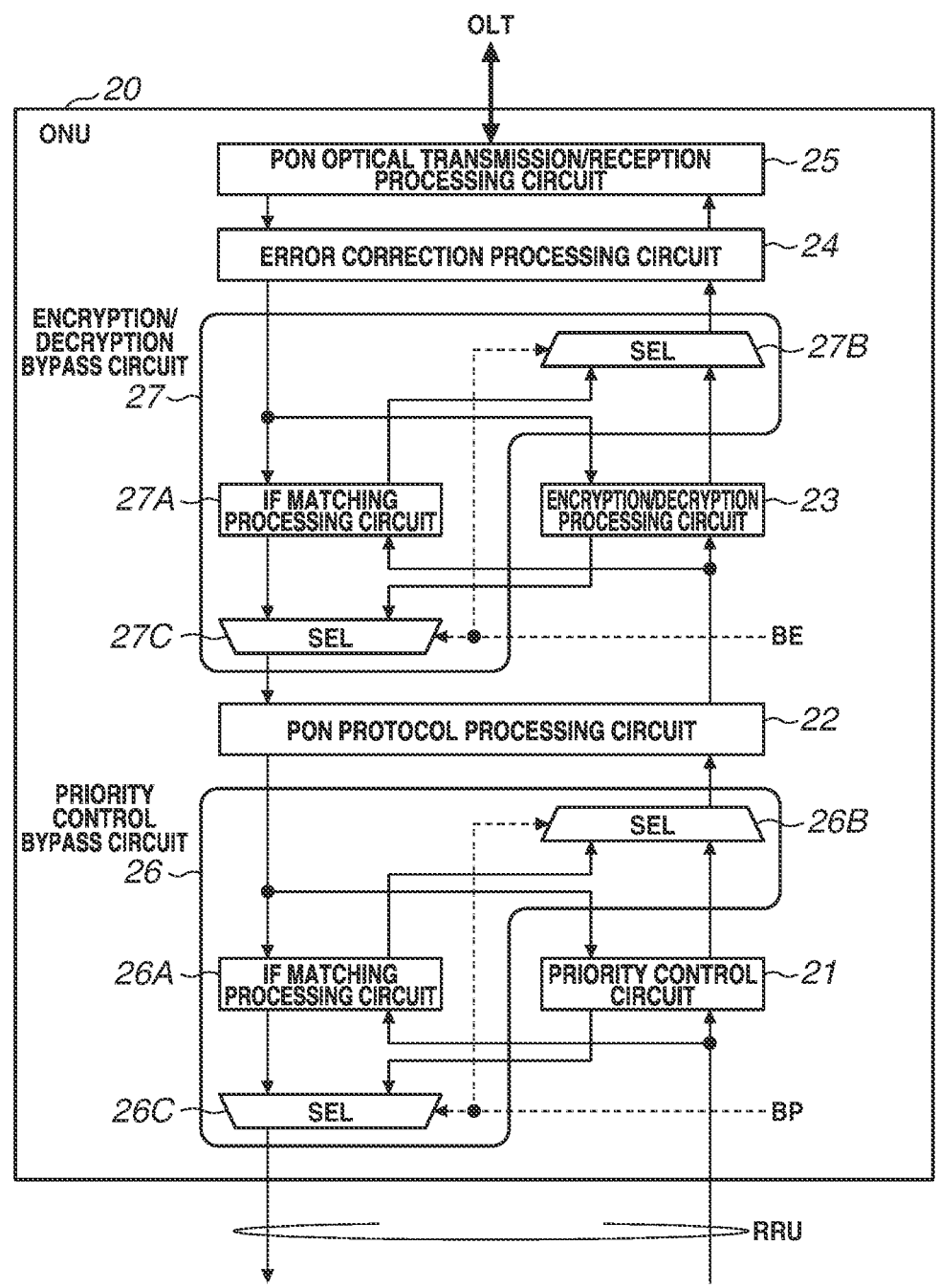
FIG. 3 is a block diagram showing the arrangement of an ONU according to the first embodiment.

As shown in FIG. 3, the priority control bypass circuit 26 includes, as main processing circuits, an IF matching processing circuit 26A and selectors SELs 26B and 26C. In addition, the encryption/decryption bypass circuit 27 includes, as main processing circuits, an IF matching processing circuit 27A and selectors SELs 27B and 27C.

The IF matching processing circuit 26A has a function of receiving uplink input data output from the RRU and to be input to the priority control circuit 21 as the target of bypass and matching the interface of a standard, a format, and the like concerning the uplink input data with that of uplink non-bypass data obtained by applying priority control processing to the uplink input data, thereby generating uplink bypass data that has bypassed the priority control processing.

In addition, the IF matching processing circuit 26A has a function of receiving downlink input data output from the PON protocol processing circuit 12 and to be input to the priority control circuit 21 as the target of bypass and matching the interface of a standard, a format, and the like concerning the downlink input data with that of downlink non-bypass data obtained by applying priority control processing to the downlink input data, thereby generating downlink bypass data that has bypassed the priority control processing.

The SEL 26B has a function of switching and selecting one of uplink non-bypass data output from the priority control circuit 21 and uplink bypass data output from the IF matching processing circuit 26A in accordance with the priority control bypass instruction BP and outputting the data to the PON protocol processing circuit 22.

The SEL 26C has a function of switching and selecting one of downlink non-bypass data output from the priority control circuit 21 and downlink bypass data output from the IF matching processing circuit 26A in accordance with the priority control bypass instruction BP and outputting the data to the RRU.

Hence, when the priority control bypass instruction BP indicates non-bypass, the uplink non-bypass data output from the priority control circuit 21 is selected by the SEL 26B and output to the PON protocol processing circuit 22, and the downlink non-bypass data output from the priority control circuit 21 is selected by the SEL 26C and output to the RRU. On the other hand, when the priority control bypass instruction BP indicates bypass, the uplink bypass data output from the IF matching processing circuit 26A is selected by the SEL 26B and output to the PON protocol processing circuit 22, and the downlink bypass data output from the IF matching processing circuit 26A is selected by the SEL 26C and output to the RRU. The priority control processing by the priority control circuit 21 is thus bypassed.

The IF matching processing circuit 27A has a function of receiving uplink input data output from the PON protocol processing circuit 22 and to be input to the encryption/decryption processing circuit 23 as the target of bypass and matching the interface of a standard, a format, and the like concerning the uplink input data with that of uplink non-bypass data obtained by applying encryption/decryption processing to the uplink input data, thereby generating uplink bypass data that has bypassed the encryption/decryption processing.

In addition, the IF matching processing circuit 27A has a function of receiving downlink input data output from the error correction processing circuit 24 and to be input to the encryption/decryption processing circuit 23 as the target of bypass and matching the interface of a standard, a format, and the like concerning the downlink input data with that of downlink non-bypass data obtained by applying encryption/decryption processing to the downlink input data, thereby generating downlink bypass data that has bypassed the encryption/decryption processing.

The SEL 27B has a function of switching and selecting one of uplink non-bypass data output from the encryption/decryption processing circuit 23 and uplink bypass data output from the IF matching processing circuit 27A in accordance with the encryption/decryption bypass instruction BE and outputting the data to the error correction processing circuit 24.

The SEL 27C has a function of switching and selecting one of downlink non-bypass data output from the encryption/decryption processing circuit 23 and downlink bypass data output from the IF matching processing circuit 27A in accordance with the encryption/decryption bypass instruction BE and outputting the data to the PON protocol processing circuit 22.

Hence, when the encryption/decryption bypass instruction BE indicates non-bypass, the uplink non-bypass data output from the encryption/decryption processing circuit 23 is selected by the SEL 27B and output to the error correction processing circuit 24, and the downlink non-bypass data output from the encryption/decryption processing circuit 23 is selected by the SEL 27C and output to the PON protocol processing circuit 22. On the other hand, when the encryption/decryption bypass instruction BE indicates bypass, the uplink bypass data output from the IF matching processing circuit 27A is selected by the SEL 27B and output to the error correction processing circuit 24, and the downlink bypass data output from the IF matching processing circuit 27A is selected by the SEL 26C and output to the PON protocol processing circuit 22. The encryption/decryption processing by the encryption/decryption processing circuit 23 is thus bypassed.

Effect of First Embodiment

As described above, in this embodiment, the OLT 10 is provided with the priority control bypass circuit 16 and the encryption/decryption bypass circuit 17, and one or both of encryption/decryption processing and priority control processing are bypassed in accordance with the priority control bypass instruction BP and the encryption/decryption bypass instruction BE, which are set in advance.

Alternatively, the ONU 20 is provided with the priority control bypass circuit 26 and the encryption/decryption bypass circuit 27, and one or both of encryption/decryption processing and priority control processing are bypassed in accordance with the priority control bypass instruction BP and the encryption/decryption bypass instruction BE, which are set in advance.

Accordingly, the priority control bypass instruction BP and the encryption/decryption bypass instruction BE are set in accordance with the position of the division point of wireless protocol processes to be divisionally executed by the CU and the RRU, thereby bypassing encryption/decryption processing and priority control processing in the OLT 10 or the ONU 20, which are duplicately executed for data transferred by the MFH. It is therefore possible to omit wasteful duplicate processing in the OLT 10 and the ONU 20 and, as a result, reduce the processing delay.

Note that in this embodiment, the description has been made assuming that the priority control bypass circuit 16 and the encryption/decryption bypass circuit 17 in the OLT 10 or the priority control bypass circuit 26 and the encryption/decryption bypass circuit 27 in the ONU 20 are provided as a pair. However, the present invention is not limited to this. If the processing delay can be reduced using only one of the circuits, they need not be provided as a pair.

Second Embodiment

A wireless network system 1 according to the second embodiment of the present invention will be described next.

In the first embodiment, a case in which the priority control bypass instruction BP and the encryption/decryption bypass instruction BE are set in advance has been described. In this embodiment, a case in which in an OLT 10 or an ONU 20, the division point of wireless protocol processes divided in advance between a CU and an RRU is identified based on control information added to data from the CU or the RRU, and a priority control bypass instruction BP and an encryption/decryption bypass instruction BE are autonomously generated will be described.

[OLT]

The arrangements and operations of a priority control bypass circuit 16 and an encryption/decryption bypass circuit 17 of the OLT 10 according to this embodiment will be described next in detail with reference to FIG. 4.

Figure 4:
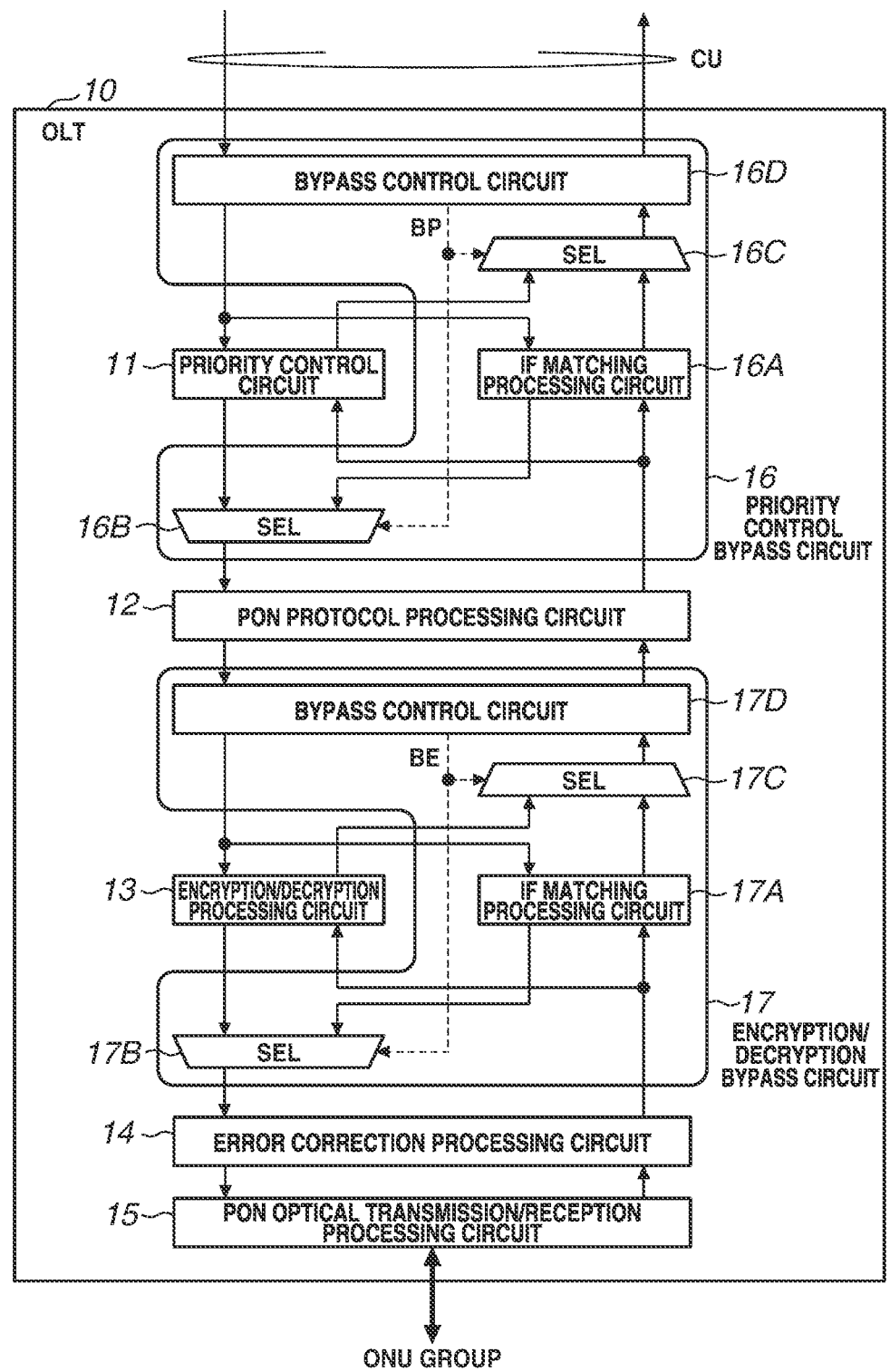
FIG. 4 is a block diagram showing the arrangement of an OLT according to the second embodiment.

As shown in FIG. 4, a bypass control circuit 16D is added to the priority control bypass circuit 16 of the OLT 10 according to this embodiment, as compared to FIG. 2. Similarly, a bypass control circuit 17D is added to the encryption/decryption bypass circuit 17.

The bypass control circuit 16D has a function of identifying the position of the division point of wireless protocol processes divided in advance between the CU and the RRU, based on control information included in downlink data output from the CU or uplink data output from a UE, and a function of generating the priority control bypass instruction BP in accordance with the obtained position of the division point and outputting the priority control bypass instruction BP to SELs 16B and 16C.

The bypass control circuit 17D has a function of identifying the position of the division point of wireless protocol processes divided in advance between the CU and the RRU, based on control information included in downlink data output from the CU or uplink data output from the UE, and a function of generating the encryption/decryption bypass instruction BE in accordance with the obtained position of the division point and outputting the encryption/decryption bypass instruction BE to SELs 17B and 17C.

As for generation processing of the bypass instruction in the bypass control circuit 16D and the bypass control circuit 17D, the priority control bypass instruction BP and the encryption/decryption bypass instruction BE may be generated by referring to a preset table based on new tag information representing the division point position, which is added to uplink data or downlink data as control information in the CU or RRU. For example, 2-bit instruction data "11" (binary value) is set in the table in correspondence with a tag value "0" representing the MAC-PHY division method, and 2-bit instruction data "01" (binary value) is set in the table in correspondence with a tag value "1" representing the PDCP-RLC division method.

The upper bit of the instruction data corresponds to the priority control bypass instruction BP (1 . . . bypass, 0 . . . non-bypass), and the lower bit corresponds to the encryption/decryption bypass instruction BE (1 . . . bypass, 0 . . . non-bypass). Hence, if the acquired tag value is "0" representing the MAC-PHY division method, the encryption/decryption bypass instruction BE and the priority control bypass instruction BP, which instruct "bypass", are output based on the instruction data "11" obtained from the table.

In addition, if the acquired tag value is "1" representing the PDCP-RLC division method, the priority control bypass instruction BP that instructs "non-bypass" and the encryption/decryption bypass instruction BE that instructs "bypass" are output based on the instruction data "01" obtained from the table.

Note that the priority control bypass instruction BP and the encryption/decryption bypass instruction BE may be generated by extracting, as control information in place of the tag value, existing control information stored in uplink data or downlink data exchanged for control between the CU and the RRU and referring to a table using the control information like a tag value.

Accordingly, the bypass control circuit 16D identifies the division point position of the wireless protocol processes based on downlink data from the CU or uplink data from the UE, and outputs the priority control bypass instruction BP according to the division point position to the SELs 16B and 16C. In addition, the bypass control circuit 17D identifies the division point position of the wireless protocol processes based on downlink data from the CU or uplink data from the UE, and outputs the encryption/decryption bypass instruction BE according to the division point position to the SELs 17B and 17C.

[ONU]

The arrangements and operations of a priority control bypass circuit 26 and an encryption/decryption bypass circuit 27 of the ONU 20 according to this embodiment will be described next in detail with reference to FIG. 5.

Figure 5:
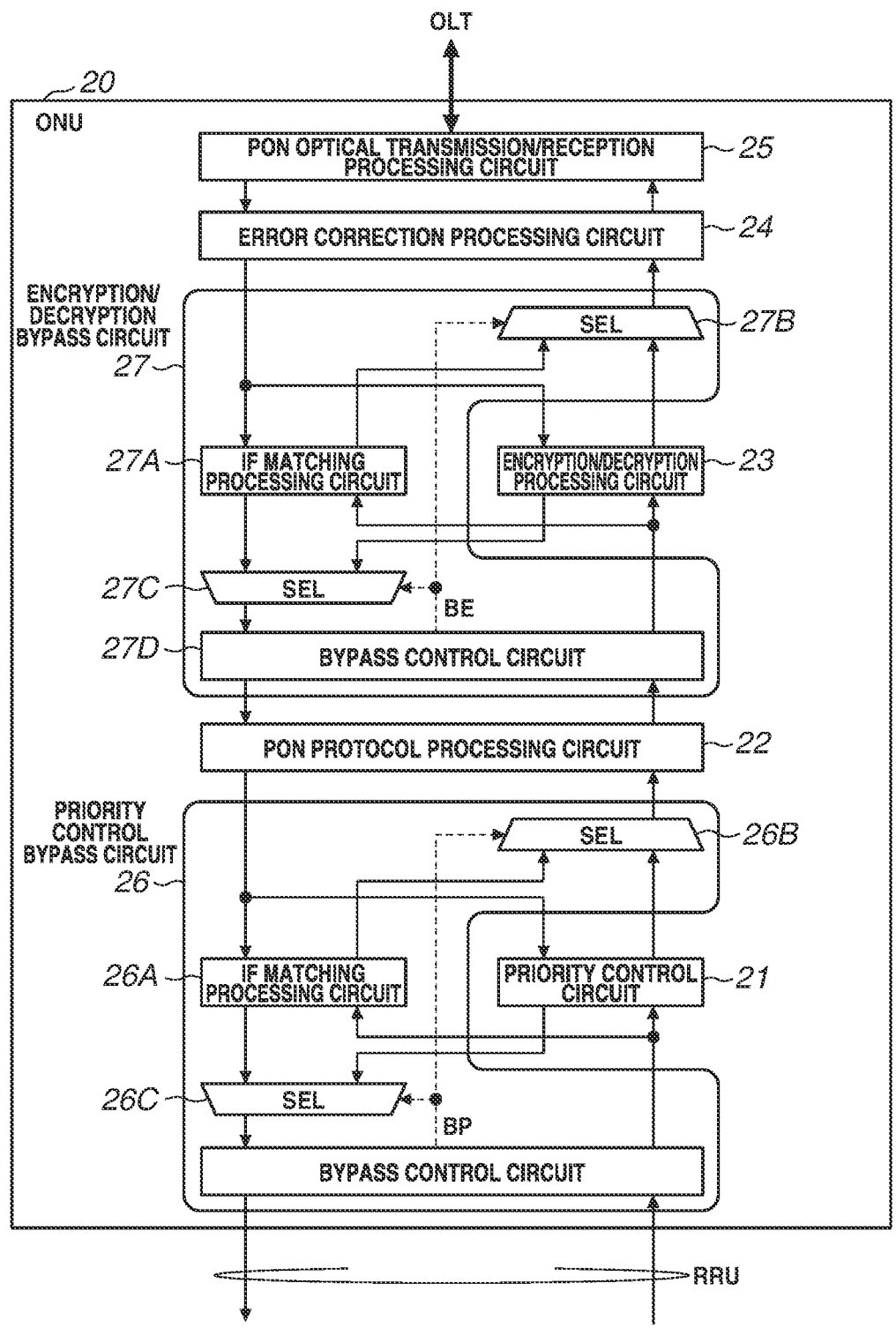
FIG. 5 is a block diagram showing the arrangement of an ONU according to the second embodiment.

As shown in FIG. 5, a bypass control circuit 26D is added to the priority control bypass circuit 26 of the ONU 20 according to this embodiment, as compared to FIG. 3. Similarly, a bypass control circuit 27D is added to the encryption/decryption bypass circuit 27.

The bypass control circuit 26D has a function of identifying the position of the division point of wireless protocol processes divided in advance between the CU and the RRU, based on control information included in downlink data output from the CU or uplink data output from the UE, and a function of generating the priority control bypass instruction BP in accordance with the obtained position of the division point and outputting the priority control bypass instruction BP to SELs 26B and 26C.

The bypass control circuit 27D has a function of identifying the position of the division point of wireless protocol processes divided in advance between the CU and the RRU, based on control information included in downlink data output from the CU or uplink data output from the UE, and a function of generating the encryption/decryption bypass instruction BE in accordance with the obtained position of the division point and outputting the encryption/decryption bypass instruction BE to SELs 27B and 27C.

Accordingly, the bypass control circuit 26D identifies the division point position of the wireless protocol processes based on downlink data from the CU or uplink data from the UE, and outputs the priority control bypass instruction BP according to the division point position to the SELs 26B and 26C. In addition, the bypass control circuit 27D identifies the division point position of the wireless protocol processes based on downlink data from the CU or uplink data from the UE, and outputs the encryption/decryption bypass instruction BE according to the division point position to the SELs 27B and 27C.

Note that generation processing of the bypass instruction in the bypass control circuit 26D and the bypass control circuit 27D is the same as that in the bypass control circuit 16D and the bypass control circuit 17D described above.

In addition, in a case in which the division point position of the wireless protocol processes is identified based on downlink data in the ONU, if the downlink data is encrypted, it is assumed that the division point position cannot be identified unless the downlink data is decrypted. However, when not only a function of decrypting encrypted data and transferring it but also a function of directly transferring non-encrypted data is imparted to the downlink encryption/decryption processing circuit in the ONU, and the initial state of the encryption/decryption bypass instruction BE is set to non-bypass, the division point position can be identified.

In addition, the division point may be identified based on not data from the CU or UE but control downlink data generated and transmitted by the OLT.

Note that the bypass control circuit 26D shown in FIG. 5 is arranged on the RRU side but may be arranged on the PON protocol processing circuit side.

Effect of Second Embodiment

As described above, in this embodiment, the bypass control circuit 16D and the bypass control circuit 26D identify the division point position of the wireless protocol processes based on the downlink data from the CU or the uplink data from the UE and generate the priority control bypass instruction BP in accordance with the division point position. In addition, the bypass control circuit 17D and the bypass control circuit 27D identify the division point position of the wireless protocol processes based on the downlink data from the CU or the uplink data from the UE and generate the encryption/decryption bypass instruction BE in accordance with the division point position.

Accordingly, in the OLT 10 or the ONU 20, the priority control bypass instruction BP and the encryption/decryption bypass instruction BE are autonomously generated based on the division point of the wireless protocol processes divided in advance between the CU and the RRU. Hence, the priority control bypass instruction BP and the encryption/decryption bypass instruction BE need not be set in advance, and the priority control bypass instruction BP and the encryption/decryption bypass instruction BE can dynamically be changed in accordance with the operation of the system.

Third Embodiment

A wireless network system 1 according to the third embodiment of the present invention will be described next with reference to FIGS. 6 and 7.

In this embodiment, encryption/decryption and priority control concerning control data exchanged between an OLT 10 and an ONU 20 will be described.

Figure 6:
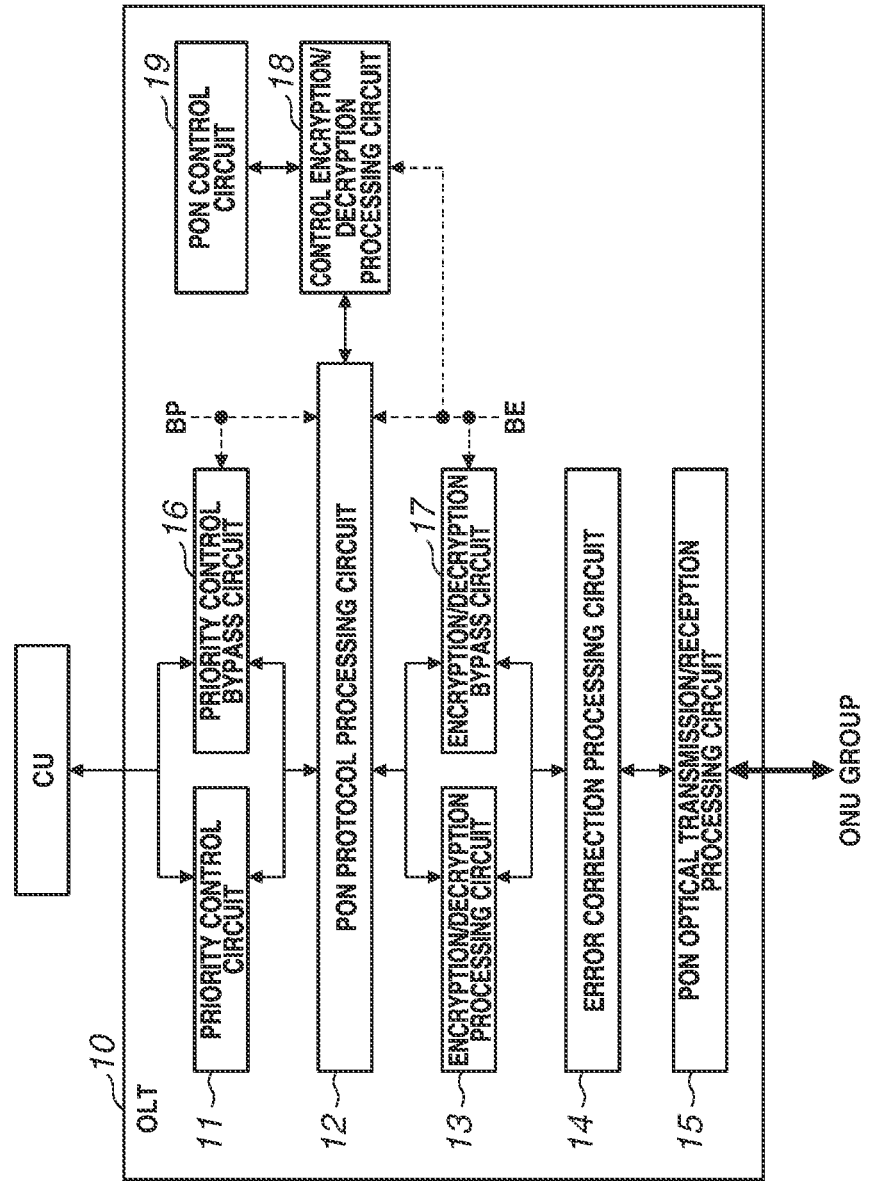
FIG. 6 is a block diagram showing the arrangement of an OLT according to the third embodiment.

Referring to FIG. 6, a PON protocol processing circuit 12 of the OLT 10 and a PON protocol processing circuit 22 of the ONU 20 have a function of exchanging various kinds of control data between the OLT 10 and the ONU 20 based on a dedicated PON protocol to control optical data communication in the PON section, for example, dynamic band allocation to each ONU 20. In this embodiment, a case of using OMCC (ONU Management and Control Channel) defined by ITU-T G989.3 (NG-PON2: Next Generation-PON2) as the PON protocol will be described as an example.

Normally, for uplink/downlink data exchange between the OLT 10 and the ONU 20, bypass application/non-application concerning bypass of encryption/decryption processing or priority control processing is decided based on an encryption/decryption bypass instruction BE and a priority control bypass instruction BP. Hence, in the arrangement example shown in FIG. 1, control data transmitted/received by the PON protocol processing circuit 12 or the PON protocol processing circuit 22 depends on the bypass application/non-application concerning uplink/downlink data.

For this reason, in a case in which encryption/decryption processing is set to bypass application, control data transmitted from the PON protocol processing circuit 12 of the OLT 10 to the PON side is transmitted to the PON side while bypassing an encryption/decryption processing circuit 13 using an encryption/decryption bypass circuit 17. For this reason, in the arrangement example shown in FIG. 1, control data that is not encrypted is exchanged in the PON section, and encryption of control data defined by the OMCC cannot be satisfied. Conversely, if control data is encrypted in advance, encryption for the control data is duplicated in a case in which the encryption/decryption processing is set to bypass non-application, and the processing load and delay increase. This also applies to the ONU 20.

In addition, the priority control processing in the PON protocol processing circuit 12 of the OLT 10 needs to be changed depending on whether the priority control processing is set to bypass non-application or bypass application. The downlink PON protocol processing circuit 12 of the OLT 10 needs to decide which one of control data of the OMCC and data from the CU should be given priority and transmit the data to the PON side. In the description of the first and second embodiments, since the PON protocol processing circuit 12 is assumed to have a general known arrangement, and a description of control data of the OMCC and the like has been omitted, a description of this function has been omitted.

In a case in which the priority control processing is set to bypass non-application, if a wait occurs in the transfer of data from the CU due to the transfer of control data of the OMCC, data having the highest priority in the data from the CU is selected and transferred as the data to be transferred next to the control data that is being transferred. Alternatively, if the priority of the next data of the OMCC is higher than the priority of the data from the CU, the next data of the OMCC is transferred. If the priority control processing is set to bypass application, the priority need not be taken into consideration for the order of data transfer.

Note that in a case in which the encryption/decryption processing is set to bypass application, to allow a PON control circuit or the like to encrypt the control data of the OMCC by arranging the transmission of the OMCC at the start of an FS payload defined by NG-PON2, the priority control processing in the PON protocol processing circuit 12 also needs to be changed, as will be described later. Details will be described later. This also applies to the ONU 20.

As shown in FIG. 6, the OLT 10 according to this embodiment includes a control encryption/decryption processing circuit 18 that performs encryption/decryption processing for control data used to control a PON system 2. The control encryption/decryption processing circuit 18 switches the presence/absence of application of encryption/decryption processing to the control data exchanged by the PON protocol processing circuit 12 in accordance with the presence/absence of bypass of the encryption/decryption processing by the encryption/decryption bypass circuit 17, more specifically, in accordance with the encryption/decryption bypass instruction BE.

Additionally, in the OLT 10, the PON protocol processing circuit 12 switches whether to execute, in the PON protocol processing circuit 12, control on a priority basis concerning data to be output to the encryption/decryption processing circuit 13 in accordance with the presence/absence of bypass of priority control processing by a priority control bypass circuit 16, more specifically, in accordance with the priority control bypass instruction BP.

Furthermore, in the OLT 10, the PON protocol processing circuit 12 switches whether to output an output permission to the priority control bypass circuit 16 or output an output permission to the priority control circuit 11 in accordance with the presence/absence of bypass of priority control processing by the priority control bypass circuit 16, more specifically, in accordance with the priority control bypass instruction BP.

Note that in FIG. 6, a case in which the control encryption/decryption processing circuit 18 as hardware is provided between the PON protocol processing circuit 12 and a PON control circuit 19 that control the PON system 2 will be described as an example. However, the present invention is not limited to this. For example, the control encryption/decryption processing circuit 18 may be implemented (hardware/software) in the PON protocol processing circuit 12 or the PON control circuit 19. If the PON control circuit 19 is externally connected as an external device (not shown) to the OLT 10, the control encryption/decryption processing circuit 18 may be provided between the OLT 10 and the external device or in the external device. The rest of the arrangement of the OLT 10 according to this embodiment is the same as in the above-described first and second embodiments, and a description thereof will be omitted here.

Figure 7:
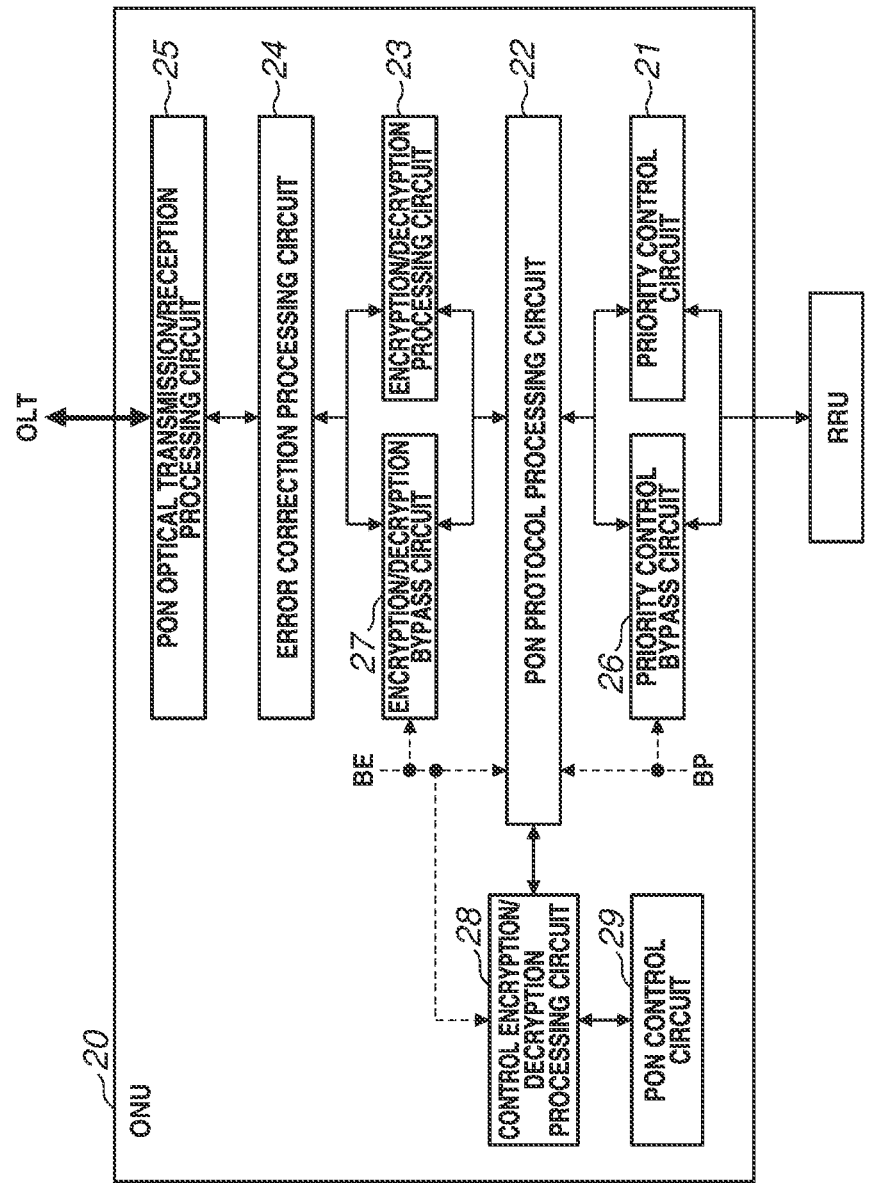
FIG. 7 is a block diagram showing the arrangement of an ONU according to the third embodiment.

In addition, as shown in FIG. 7, the ONU 20 according to this embodiment includes a control encryption/decryption processing circuit 28 that performs encryption/decryption processing for control data used to control the PON system 2. The control encryption/decryption processing circuit 28 switches the presence/absence of application of encryption/decryption processing to the control data exchanged by the PON protocol processing circuit 22 in accordance with the presence/absence of bypass of the encryption/decryption processing by an encryption/decryption bypass circuit 27, more specifically, in accordance with the encryption/decryption bypass instruction BE.

Additionally, in the ONU 20, the PON protocol processing circuit 22 switches whether to execute, in the PON protocol processing circuit 22, control on a priority basis concerning data to be output to an encryption/decryption processing circuit 23 in accordance with the presence/absence of bypass of priority control processing by a priority control bypass circuit 26, more specifically, in accordance with the priority control bypass instruction BP.

Furthermore, in the ONU 20, the PON protocol processing circuit 22 switches whether to output an output permission to the priority control bypass circuit 26 or output an output permission to a priority control circuit 21 in accordance with the presence/absence of bypass of priority control processing by the priority control bypass circuit 26, more specifically, in accordance with the priority control bypass instruction BP.

Note that in FIG. 7, a case in which the control encryption/decryption processing circuit 28 as hardware is provided between the PON protocol processing circuit 22 and a PON control circuit 29 that control the PON system 2 will be described as an example. However, the present invention is not limited to this. For example, the control encryption/decryption processing circuit 28 may be implemented (hardware/software) in the PON protocol processing circuit 22 or the PON control circuit 29. If the PON control circuit 29 is externally connected as an external device (not shown) to the ONU 20, the control encryption/decryption processing circuit 28 may be provided between the ONU 20 and the external device or in the external device. The rest of the arrangement of the ONU 20 according to this embodiment is the same as in the above-described first and second embodiments, and a description thereof will be omitted here.

Operation of Third Embodiment

The operation of the PON system 2 according to this embodiment will be described next with reference to FIGS. 6 and 7. The operations of the OLT 10 and the ONU 20 will be described here for each combination of bypass for encryption/decryption processing and priority control processing. A case of using the OMCC defined by ITU-T G989.3 (NG-PON2) as the PON protocol will be described below as an example.

[Case of Bypassing Both Encryption/Decryption Processing and Priority Control Processing]

In this embodiment, execution/non-execution of bypass is statically set in accordance with function division between the CU and the RRU in an applied MFH. More specifically, in a case in which function division between the CU and the RRU is the above-described MAC-PHY division, in the protocol stack shown in FIGS. 6 and 7, as for processing for downlink data in the downlink direction from the OLT 10 to the ONU 20, the CU performs processing up to MAC processing, and the subsequent PHY processing (=baseband processing) is executed by each RRU.

In this division, priority control for downlink radio user data is performed in the MAC processing, and encryption of the radio user data is performed in the PDCP processing. That is, downlink data that has undergone the priority control and encryption by the CU is transmitted in the MFH. For this reason, the OLT 10 and the ONU 20 according to this embodiment bypass the downlink priority control and encryption processing, which overlap with the CU. For the uplink direction from the ONU 20 to the OLT 10 as well, priority control and decryption processing are bypassed. This is because uplink data from the RRU is data that has undergone encryption and priority control by a user terminal (UE) or the RRU.

OLT: Uplink Direction

In the OLT 10, the PON protocol processing circuit 12 receives uplink data and uplink control data (control data of the OMCC) from the encryption/decryption bypass circuit 17. Of these data, the uplink control data is output to the control encryption/decryption processing circuit 18, and uplink data other than the uplink control data is output to the host device (CU) side.

At this time, the PON protocol processing circuit 12 adds decryption information such as SFC (SuperFrame Counter) and IFC (Intra-Frame Counter), which are necessary for decryption of the uplink control data, to the uplink control data and outputs it. Accordingly, the uplink control data is decrypted by the control encryption/decryption processing circuit 18 based on the decryption information and then used for control of the PON system 2 by the PON control circuit 19. In addition, the uplink data other than the uplink control data is output from the OLT 10 to the host device side via the priority control bypass circuit 16.

OLT: Downlink Direction

In the OLT 10, the PON protocol processing circuit 12 acquires downlink data from the priority control bypass circuit 16 and downlink control data output from the PON control circuit 19 and encrypted by the control encryption/decryption processing circuit 18, inserts the downlink data from the priority control bypass circuit 16 and the downlink control data into an FS payload, and outputs it to the PON side. Accordingly, the downlink data from the priority control bypass circuit 16 and the downlink control data are output to an error correction processing circuit 14 via the encryption/decryption bypass circuit 17.

In general, to encrypt the control data of the OMCC by the control encryption/decryption processing circuit 18 formed by software or a device other than the OLT 10, SFC and IFC are needed. In this embodiment, the PON protocol processing circuit 12 inserts the downlink control data to the start position of the FS payload and then inserts the downlink data from the priority control bypass circuit 16 to the subsequent position. Accordingly, at the time of encryption, the IFC can be decided from the FS header length managed by software. As for the SFC, for example, at the time of FS header generation, the SFC of a PHY frame that transmits the header is designated by software, and the SFC (the SFC of the PHY frame in which the FS payload is inserted) upon deciding the IFC is used.

Note that when inserting the downlink data from the priority control bypass circuit 16 into the FS payload, the priority of the data need not be taken into consideration. However, since priority is given to the insertion of the downlink control data, a buffer for the downlink data from the priority control bypass circuit 16 is provided in the PON protocol processing circuit 12. Alternatively, a function of permitting the priority control bypass circuit 16 to do output is provided in the PON protocol processing circuit 12, thereby permitting the priority control bypass circuit 16 to do output only when inserting the downlink data from the priority control bypass circuit 16. In the latter case, a buffer is provided in the priority control bypass circuit 16, and when the priority control bypass circuit 16 receives an output permission input from the PON protocol processing circuit 12, the data is output from the buffer.

ONU: Uplink Direction

In the ONU 20, the PON protocol processing circuit 22 acquires uplink data from the priority control bypass circuit 26 and uplink control data output from the PON control circuit 29 and encrypted by the control encryption/decryption processing circuit 28, inserts the downlink data from the priority control bypass circuit 26 having the same Allocation-ID and the downlink control data into the same FS payload, and outputs it to the PON side.

At this time, for each Allocation-ID, the PON protocol processing circuit 22 inserts the uplink control data of the Allocation-ID to the start position of the FS payload and then inserts the uplink data from the priority control bypass circuit 26 of the Allocation-ID to the subsequent position. Accordingly, the uplink data from the priority control bypass circuit 26 and the uplink control data are output to an error correction processing circuit 24 via the encryption/decryption bypass circuit 27. Note that in a case of an Allocation-ID that does not include control data or in a case in which control data is absent, the uplink data from the priority control bypass circuit 26 is inserted from the start position of the FS payload.

In general, to encrypt the control data of the OMCC by the control encryption/decryption processing circuit 28 formed by software or a device other than the ONU, SFC and IFC are needed. In this embodiment, for the uplink data from the priority control bypass circuit 26 of the same Allocation-ID and the uplink control data, the PON protocol processing circuit 22 inserts the uplink control data to the start position of the FS payload and then inserts the uplink data from the priority control bypass circuit 26 to the subsequent position. Accordingly, at the time of encryption, the IFC can be decided from uplink band allocation information (StartTime/GrantSize/presence or absence of DBRu/presence or absence of PLOAMu of BWmap). Additionally, as for the SFC, an SFC value corresponding to BWmap is used by allowing software or the like to manage the SFC value.

Note that when inserting the uplink data from the priority control bypass circuit 26 into the FS payload, the priority of the data need not be taken into consideration. However, since priority is given to the insertion of the uplink control data, a buffer for the uplink data from the priority control bypass circuit 26 is provided in the PON protocol processing circuit 22 for each Allocation-ID. Alternatively, a function of permitting the priority control bypass circuit 26 to do output (and a function of outputting the information of Allocation-ID permitted to output) is provided in the PON protocol processing circuit 22, thereby permitting the priority control bypass circuit 26 to do output only when inserting the uplink data from the priority control bypass circuit 26.

In the latter case, a buffer is provided in the priority control bypass circuit 26 for each Allocation-ID, and when the priority control bypass circuit 26 receives an output permission (and the information of permitted Allocation-ID) input from the PON protocol processing circuit 22, the data is output from the buffer of the permitted Allocation-ID.

ONU: Downlink Direction

In the ONU 20, the PON protocol processing circuit 22 receives downlink data and downlink control data from the encryption/decryption bypass circuit 27. Of these data, the downlink control data is output to the control encryption/decryption processing circuit 28, and downlink data other than the downlink control data is output to the user terminal side.

At this time, the PON protocol processing circuit 22 adds decryption information such as SFC and IFC, which are necessary for decryption of the downlink control data, to the downlink control data and outputs it. Accordingly, the downlink control data is decrypted by the control encryption/decryption processing circuit 28 based on the decryption information and then used for control of the PON system 2 in the PON control circuit 29. In addition, the downlink data other than the downlink control data is output from the ONU 20 to the user terminal side via the priority control bypass circuit 26.

[Case of Bypassing Only Encryption/Decryption Processing]

In a case in which function division between the CU and the RRU is PDCP-RLC division, the CU executes processing up to PDCP processing, and the subsequent RLC processing is executed by each RRU. That is, downlink data transferred from the CU is data after encryption but before priority control. For this reason, the OLT 10 and the ONU 20 according to this embodiment bypass only the encryption/decryption processing circuit when applying to the divided MFH between the CU and the RRU. In the uplink as well, only the encryption/decryption processing circuit is bypassed.

OLT: Uplink Direction

In the OLT 10, the PON protocol processing circuit 12 receives uplink data and uplink control data from the encryption/decryption bypass circuit 17. Of these data, the uplink control data is output to the control encryption/decryption processing circuit 18, and uplink data other than the uplink control data is output to the host device (CU) side.

At this time, the PON protocol processing circuit 12 adds decryption information such as SFC and IFC, which are necessary for decryption of the uplink control data, to the uplink control data and outputs it. Accordingly, the uplink control data is decrypted by the control encryption/decryption processing circuit 18 based on the decryption information and then used for control of the PON system 2 by the PON control circuit 19. In addition, the uplink data other than the uplink control data is output from the OLT 10 to the host device side via the priority control circuit 11.

OLT: Downlink Direction

In the OLT 10, the PON protocol processing circuit 12 acquires downlink data from the priority control circuit 11 and downlink control data output from the PON control circuit 19 and encrypted by the control encryption/decryption processing circuit 18, inserts the downlink data from the priority control circuit 11 and the downlink control data into an FS payload, and outputs it to the PON side. Accordingly, the downlink data from the priority control circuit 11 and the downlink control data are output to the error correction processing circuit 14 via the encryption/decryption bypass circuit 17.

In general, to encrypt the control data of the OMCC by the control encryption/decryption processing circuit 18 formed by software or a device other than the OLT 10, SFC and IFC are needed. In this embodiment, the PON protocol processing circuit 12 inserts the downlink control data to the start position of the FS payload and then inserts the downlink data from the priority control circuit 11 to the subsequent position. Accordingly, at the time of encryption, the IFC can be decided from the FS header length managed by software. As for the SFC, for example, at the time of FS header generation, the SFC of a PHY frame that transmits the header is designated by software, and the SFC (the SFC of the PHY frame in which the FS payload is inserted) upon deciding the IFC is used.

Note that when inserting the downlink data from the priority control circuit 11 into the FS payload, data of a higher priority needs to be preferentially inserted in consideration of the priority of the data. For this purpose, a buffer for each priority is provided in the PON protocol processing circuit 12, and priority is given to the output (insertion into the FS payload) from a buffer of a higher priority. Alternatively, a function of permitting the priority control circuit 11 to do output is provided in the PON protocol processing circuit 12, thereby permitting the priority control circuit 11 to do output only when inserting the downlink data from the priority control circuit 11. In the latter case, a buffer for each priority in the priority control circuit 11 is used, and when the priority control circuit 11 receives an output permission input from the PON protocol processing circuit 12, the output from a buffer of a higher priority is preferentially output.

ONU: Uplink Direction

In the ONU 20, the PON protocol processing circuit 22 acquires uplink data from the priority control circuit 21 and uplink control data output from the PON control circuit 29 and encrypted by the control encryption/decryption processing circuit 28, inserts the uplink data from the priority control circuit 21 having the same Allocation-ID and the uplink control data into the same FS payload, and outputs it to the PON side.

At this time, for each Allocation-ID, the PON protocol processing circuit 22 inserts the uplink control data of the Allocation-ID to the start position of the FS payload and then inserts the uplink data from the priority control circuit 21 of the Allocation-ID to the subsequent position. Accordingly, the uplink data from the priority control circuit 21 and the uplink control data are output to the error correction processing circuit 24 via the encryption/decryption bypass circuit 27. Note that in a case of an Allocation-ID that does not include the control data of the OMCC or in a case in which the control data of the OMCC is absent, the uplink data from the priority control circuit 21 is inserted from the start position of the FS payload.

In general, to encrypt the control data of the OMCC by the control encryption/decryption processing circuit 28 formed by software or a device other than the ONU, SFC and IFC are needed. In this embodiment, for the uplink data from the priority control circuit 21 of the same Allocation-ID and the uplink control data, the PON protocol processing circuit 22 inserts the uplink control data to the start position of the FS payload and then inserts the uplink data from the priority control circuit 21 to the subsequent position. Accordingly, at the time of encryption, the IFC can be decided from uplink band allocation information (StartTime/GrantSize/presence or absence of DBRu/presence or absence of PLOAMu of BWmap). Additionally, as for the SFC, an SFC value corresponding to BWmap is used by allowing software or the like to manage the SFC value.

Note that when inserting the uplink data from the priority control circuit 21 into the FS payload, data of a higher priority needs to be preferentially inserted in consideration of the priority of the data. For this purpose, a buffer for each priority is provided in the PON protocol processing circuit 22 for each Allocation-ID, and priority is given to the output (insertion into the FS payload) from a buffer of a higher priority. Alternatively, a function of permitting the priority control circuit 21 to do output (and a function of outputting the information of Allocation-ID permitted to output) is provided in the PON protocol processing circuit 22, thereby permitting the priority control circuit 21 to do output only when inserting the uplink data from the priority control circuit 21.

In the latter case, a buffer for each priority is provided in the priority control circuit 21 for each Allocation-ID, and when the priority control circuit 21 receives an output permission (and the information of permitted Allocation-ID) input from the PON protocol processing circuit 22, the output from a buffer of a higher priority of the permitted Allocation-ID is preferentially output.

Note that in both the former case and the latter case, when selectively using the Allocation-ID for each priority, the buffer for each priority need not be provided for each Allocation-ID, and the data to be inserted into the FS payload (the data to be output from the priority control circuit 21 in the latter case) can be decided based on only the Allocation-ID.

ONU: Downlink Direction

In the ONU 20, the PON protocol processing circuit 22 receives downlink data and downlink control data from the encryption/decryption bypass circuit 27. Of these data, the downlink control data is output to the control encryption/decryption processing circuit 28, and downlink data other than the downlink control data is output to the user terminal side.

At this time, the PON protocol processing circuit 22 adds decryption information such as SFC and IFC, which are necessary for decryption of the downlink control data, to the downlink control data and outputs it. Accordingly, the downlink control data is decrypted by the control encryption/decryption processing circuit 28 based on the decryption information and then used for control of the PON system 2 in the PON control circuit 29. In addition, the downlink data other than the downlink control data is output from the ONU 20 to the user terminal side via the priority control circuit 21.

[Case of Bypassing Neither Encryption/Decryption Processing Nor Priority Control Processing]

OLT: Uplink Direction

In the OLT 10, the PON protocol processing circuit 12 receives uplink data and uplink control data from the encryption/decryption processing circuit 13. Of these data, the uplink control data is output to the control encryption/decryption processing circuit 18, and uplink data other than the uplink control data is output to the host device (CU) side.

At this time, since the uplink control data is decrypted by the encryption/decryption processing circuit 13, decryption information such as SFC and IFC is unnecessary and need not be added to the uplink control data and output. In addition, the control encryption/decryption processing circuit 18 directly outputs the uplink control data to the PON control circuit 19 without decrypting it. In addition, the uplink data other than the uplink control data is output from the OLT 10 to the host device side via the priority control circuit 11.

OLT: Downlink Direction

In the OLT 10, the PON protocol processing circuit 12 acquires downlink data from the priority control circuit 11 and downlink control data that is output from the PON control circuit 19 and is not encrypted by the control encryption/decryption processing circuit 18, inserts the downlink data from the priority control circuit 11 and the downlink control data into an FS payload, and outputs it to the PON side. Accordingly, the downlink data from the priority control circuit 11 and the downlink control data are output to the error correction processing circuit 14 via the encryption/decryption processing circuit 13.

When inserting the data into the FS payload, data of a higher priority needs to be preferentially inserted in consideration of the priority of the data. For this purpose, a buffer for each priority is provided in the PON protocol processing circuit 12, and priority is given to the output (insertion into the FS payload) from a buffer of a higher priority. Alternatively, a buffer for downlink control data on a priority basis and a function of permitting the priority control circuit 11 to do output are provided in the PON protocol processing circuit 12, thereby permitting the priority control circuit 11 to do output only when inserting the downlink data from the priority control circuit 11.

In the former case, the downlink data from the priority control circuit 11 and the downlink control data are stored in the same buffer in accordance with the priority. Alternatively, a buffer for the downlink data from the priority control circuit 11 and a buffer for the downlink control data are separately provided on a priority basis, and if the priority of the downlink data from the priority control circuit 11 and the priority of the downlink control data are the same, the data are, for example, alternately inserted into the FS payload.

In the latter case, the PON protocol processing circuit 12 decides, based on a setting or the like, for example, which one of the downlink data from the priority control circuit 11 and the downlink control data should be inserted at which frequency. When inserting the downlink control data into the FS payload, the downlink control data is inserted from the buffer for downlink control data in the PON protocol processing circuit 12 in accordance with the priority. When inserting the downlink data from the priority control circuit 11 into the FS payload, a buffer for each priority in the priority control circuit 11 is used, and when the priority control circuit 11 receives an output permission input from the PON protocol processing circuit 12, the output from a buffer of a higher priority is preferentially output.

Note that in both the former case and the latter case, the insertion of the downlink control data into the FS payload may be given higher priority than the insertion of the downlink data from the priority control circuit 11.

ONU: Uplink Direction

In the ONU 20, the PON protocol processing circuit 22 acquires uplink data from the priority control circuit 21 and uplink control data that is output from the PON control circuit 29 and is not encrypted by the control encryption/decryption processing circuit 28, inserts the uplink data from the priority control circuit 21 having the same Allocation-ID and the uplink control data into the same FS payload, and outputs it to the PON side.

When inserting the data into the FS payload, data of a higher priority needs to be preferentially inserted in consideration of the priority of the data. For this purpose, a buffer for each priority is provided in the PON protocol processing circuit 22 for each Allocation-ID, and priority is given to the output (insertion into the FS payload) from a buffer of a higher priority. Alternatively, a buffer for uplink control data on a priority basis and a function of permitting the priority control circuit 21 to do output (and a function of outputting the information of Allocation-ID permitted to output) are provided in the PON protocol processing circuit 22, thereby permitting the priority control circuit 21 to do output only when inserting the uplink data from the priority control circuit 21.

In the former case, the uplink data from the priority control circuit 21 and the uplink control data are stored in the same buffer in accordance with the priority. Alternatively, a buffer for the uplink data from the priority control circuit 21 and a buffer for the uplink control data are separately provided on a priority basis, and if the priority of the uplink data from the priority control circuit 21 and the priority of the uplink control data are the same, the data are, for example, alternately inserted into the FS payload.

In the latter case, the PON protocol processing circuit 22 decides, based on a setting or the like, for example, which one of the uplink data from the priority control circuit 21 and the uplink control data should be inserted at which frequency. When inserting the uplink control data into the FS payload, the uplink control data is inserted from the buffer for uplink control data in the PON protocol processing circuit 22 in accordance with the priority. When inserting the uplink data from the priority control circuit 21 into the FS payload, a buffer for each priority is provided in the priority control circuit 21 for each Allocation-ID, and when the priority control circuit 21 receives an output permission (and the information of permitted Allocation-ID) input from the PON protocol processing circuit 22, the output from a buffer of a higher priority of the permitted Allocation-ID is preferentially output.

Note that in both the former case and the latter case, when selectively using the Allocation-ID for each priority, the buffer for each priority need not be provided for each Allocation-ID, and the data to be inserted into the FS payload (the data to be output from the priority control circuit 21 in the latter case) can be decided based on only the Allocation-ID.

Additionally, in both the former case and the latter case, the insertion of the uplink control data into the FS payload may be given higher priority than the insertion of the uplink data from the priority control circuit 21.

ONU: Downlink Direction

In the ONU 20, the PON protocol processing circuit 22 receives downlink data and downlink control data from the encryption/decryption processing circuit 23. Of these data, the downlink control data is output to the control encryption/decryption processing circuit 28, and downlink data other than the downlink control data is output to the user terminal side.

Effect of Third Embodiment

As described above, in this embodiment, the OLT 10 is provided with the control encryption/decryption processing circuit 18 that performs encryption/decryption processing for control data used to control the PON system 2, and is also provided with the encryption/decryption bypass circuit 17 serving as a bypass circuit that bypasses the encryption/decryption processing by the encryption/decryption processing circuit 13 in accordance with the bypass instruction. The control encryption/decryption processing circuit 18 switches the presence/absence of application of the encryption/decryption processing to the control data exchanged by the PON protocol processing circuit 12 in accordance with the presence/absence of bypass for the encryption/decryption processing by the encryption/decryption bypass circuit 17.

Alternatively, the ONU 20 is provided with the control encryption/decryption processing circuit 28 that performs encryption/decryption processing for control data used to control the PON system 2, and is also provided with the encryption/decryption bypass circuit 27 serving as a bypass circuit that bypasses the encryption/decryption processing by the encryption/decryption processing circuit 23 in accordance with the bypass instruction. The control encryption/decryption processing circuit 28 switches the presence/absence of application of the encryption/decryption processing to the control data exchanged by the PON protocol processing circuit 12 in accordance with the presence/absence of bypass for the encryption/decryption processing by the encryption/decryption bypass circuit 27.

Accordingly, in the OLT 10, when the encryption/decryption processing is bypassed by the encryption/decryption bypass circuit 17, the control data exchanged by the PON protocol processing circuit 12 undergoes the encryption/decryption processing by the control encryption/decryption processing circuit 18. Additionally, in the ONU 20, when the encryption/decryption processing is bypassed by the encryption/decryption bypass circuit 27, the control data exchanged by the PON protocol processing circuit 22 undergoes the encryption/decryption processing by the control encryption/decryption processing circuit 28.

It is therefore possible to avoid exchange of unencrypted control data in the PON section and satisfy encryption of control data defined by the OMCC. To the contrary, as compared to a case in which control data is encrypted in advance, it is possible to avoid duplication of encryption of control data when the encryption/decryption processing is set to bypass non-application, and it is possible to avoid an increase in the processing load and delay.

Additionally, in this embodiment, the OLT 10 is provided with the priority control bypass circuit 16 serving as a bypass circuit that bypasses the priority control processing in accordance with the bypass instruction, and the PON protocol processing circuit 12 switches whether to execute, in the PON protocol processing circuit 12, control for each priority concerning data to be output to the encryption/decryption processing circuit 13 in accordance with the presence/absence of bypass of the priority control processing by the priority control bypass circuit 16.

Alternatively, the ONU 20 is provided with the priority control bypass circuit 26 serving as a bypass circuit that bypasses the priority control processing in accordance with the bypass instruction, and the PON protocol processing circuit 22 switches whether to execute, in the PON protocol processing circuit 22, control (for example, buffering for each priority) for each priority concerning data to be output to the encryption/decryption processing circuit 23 in accordance with the presence/absence of bypass of the priority control processing by the priority control bypass circuit 26.

Accordingly, in the OLT 10, when the priority control processing is not bypassed by the priority control bypass circuit 16, the data to be output to the encryption/decryption processing circuit 13 is controlled for each priority (for example, buffered for each priority). It is therefore possible to appropriately maintain the priority of the data output from the priority control circuit 11 even if a conflict with the output of the control data (insertion into an FS payload) occurs.

Additionally, in this embodiment, the OLT 10 is provided with the priority control bypass circuit 16 serving as a bypass circuit that bypasses the priority control processing in accordance with the bypass instruction, and the PON protocol processing circuit 12 switches whether to output an output permission to the priority control bypass circuit 16 or output an output permission to the priority control circuit 11 in accordance with the presence/absence of bypass of the priority control processing by the priority control bypass circuit 16.

Alternatively, the ONU 20 is provided with the priority control bypass circuit 26 serving as a bypass circuit that bypasses the priority control processing in accordance with the bypass instruction, and the PON protocol processing circuit 22 switches whether to output an output permission to the priority control bypass circuit 26 or output an output permission to the priority control circuit 21 in accordance with the presence/absence of bypass of the priority control processing by the priority control bypass circuit 26.

Accordingly, in the OLT 10, when the priority control processing is not bypassed by the priority control bypass circuit 16, the priority control circuit 11 outputs data only when the output permission is input. When the priority control processing is bypassed, the priority control bypass circuit 16 outputs data only when the output permission is input. The PON protocol processing circuit 12 is inhibited from outputting the output permission when inserting the control data into the FS payload. This makes it possible to perform conflict control (order control of insertion into the FS payload) between the control data and other data (data from the priority control circuit 11 or the priority control bypass circuit 16) using the buffer in the priority control circuit 11 or the priority control bypass circuit 16 without providing a buffer for data from the priority control circuit 11 or the priority control bypass circuit 16 in the PON protocol processing circuit 12.

In addition, when the priority control processing is not bypassed, the PON protocol processing circuit 12 is inhibited from outputting the output permission when inserting the control data into the FS payload. In this case, the output from the priority control circuit 11 does not conflict with the output of the control data (insertion into the FS payload) in the PON protocol processing circuit 12. It is therefore possible to maintain the priority of the data output from the priority control circuit 11 (output the data in the order of output from the priority control circuit 11).

The same effect as in the OLT 10 can be obtained in the ONU 20 as well.

Fourth Embodiment

A wireless network system 1 according to the fourth embodiment of the present invention will be described next with reference to FIGS. 8 and 9.

In this embodiment, encryption/decryption and priority control concerning control data exchanged between an OLT 10 and an ONU 20 will be described.

In the third embodiment, a case in which the priority control bypass instruction BP and the encryption/decryption bypass instruction BE are set in advance has been described. In this embodiment, a case in which in the OLT 10 or the ONU 20, the division point of wireless protocol processes divided in advance between a CU and an RRU is identified based on a tag value added to data from a CU or an RRU, and a priority control bypass instruction BP and an encryption/decryption bypass instruction BE are autonomously generated will be described.

Figure 8:
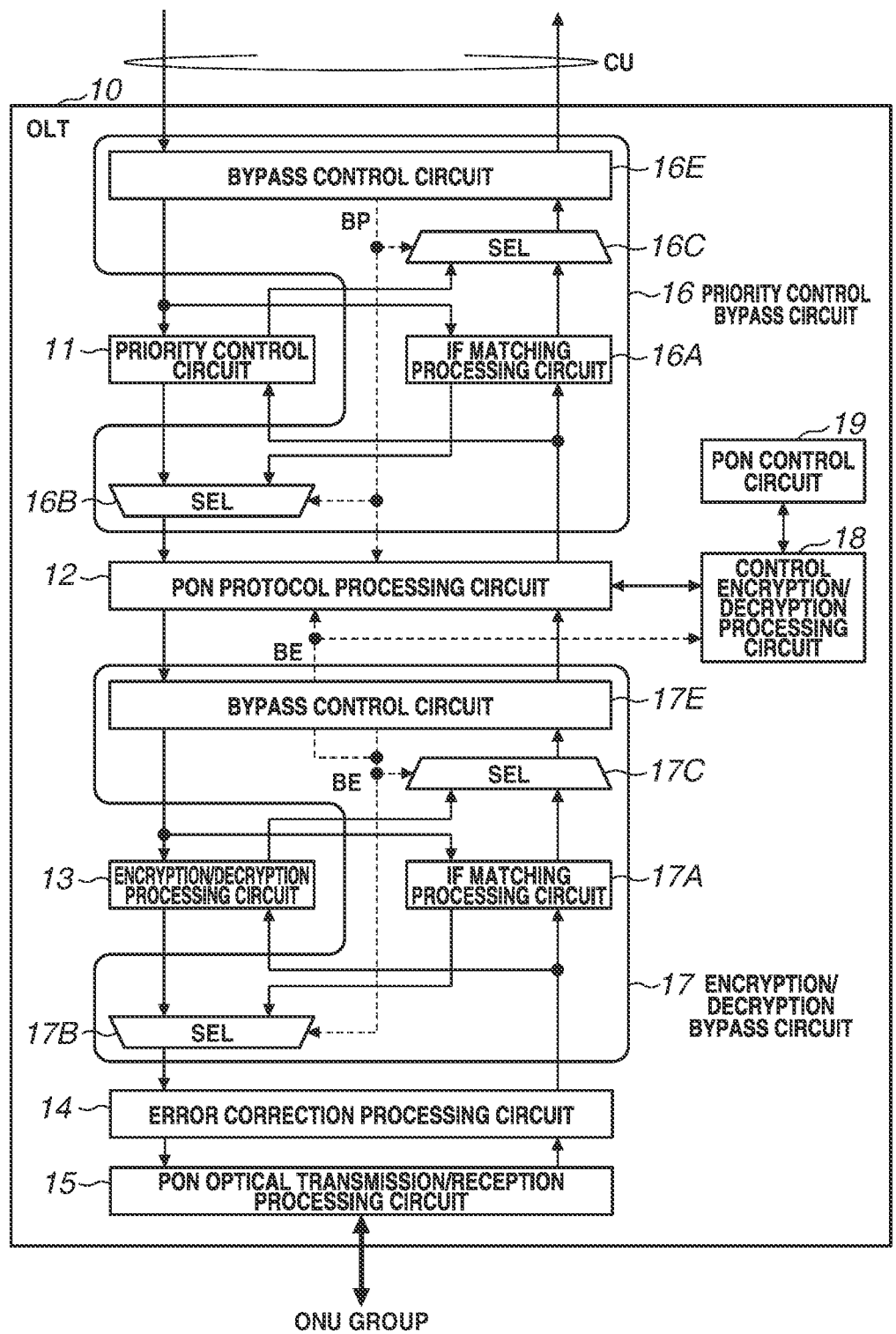
FIG. 8 is a block diagram showing the arrangement of an OLT according to the fourth embodiment.

As shown in FIG. 8, in the OLT 10 according to this embodiment, a bypass control circuit 16E is added to a priority control bypass circuit 16, as compared to FIG. 2. Similarly, a bypass control circuit 17E is added to an encryption/decryption bypass circuit 17. The bypass control circuits 16E and 17E correspond to the bypass control circuits 16D and 17D shown in FIG. 4, respectively.

The bypass control circuit 16E has a function of identifying the position of the division point of wireless protocol processes divided in advance between the CU and the RRU, based on a tag value included in downlink data output from the CU or uplink data output from a UE, and a function of generating the priority control bypass instruction BP in accordance with the obtained position of the division point and outputting the priority control bypass instruction BP to SELs 16B and 16C.

The bypass control circuit 17E has a function of identifying the position of the division point of wireless protocol processes divided in advance between the CU and the RRU, based on a tag value included in downlink data output from the CU or uplink data output from the UE, and a function of generating the encryption/decryption bypass instruction BE in accordance with the obtained position of the division point and outputting the encryption/decryption bypass instruction BE to SELs 17B and 17C.

As for generation processing of the bypass instruction in the bypass control circuit 16E and the bypass control circuit 17E, the priority control bypass instruction BP and the encryption/decryption bypass instruction BE may be generated by referring to a preset table based on new tag information representing the division point position, which is added to uplink data or downlink data as control information in the CU or RRU. For example, 2-bit instruction data "11" (binary value) is set in the table in correspondence with a tag value "0" representing the MAC-PHY division method, and 2-bit instruction data "01" (binary value) is set in the table in correspondence with a tag value "1" representing the PDCP-RLC division method.

The upper bit of the instruction data corresponds to the priority control bypass instruction BP (1 . . . bypass, 0 . . . non-bypass), and the lower bit corresponds to the encryption/decryption bypass instruction BE (1 . . . bypass, 0 . . . non-bypass). Hence, if the acquired tag value is "0" representing the MAC-PHY division method, the encryption/decryption bypass instruction BE and the priority control bypass instruction BP, which instruct "bypass", are output based on the instruction data "11" obtained from the table. In addition, if the acquired tag value is "1" representing the PDCP-RLC division method, the priority control bypass instruction BP that instructs "non-bypass" and the encryption/decryption bypass instruction BE that instructs "bypass" are output based on the instruction data "01" obtained from the table.

Figure 9:
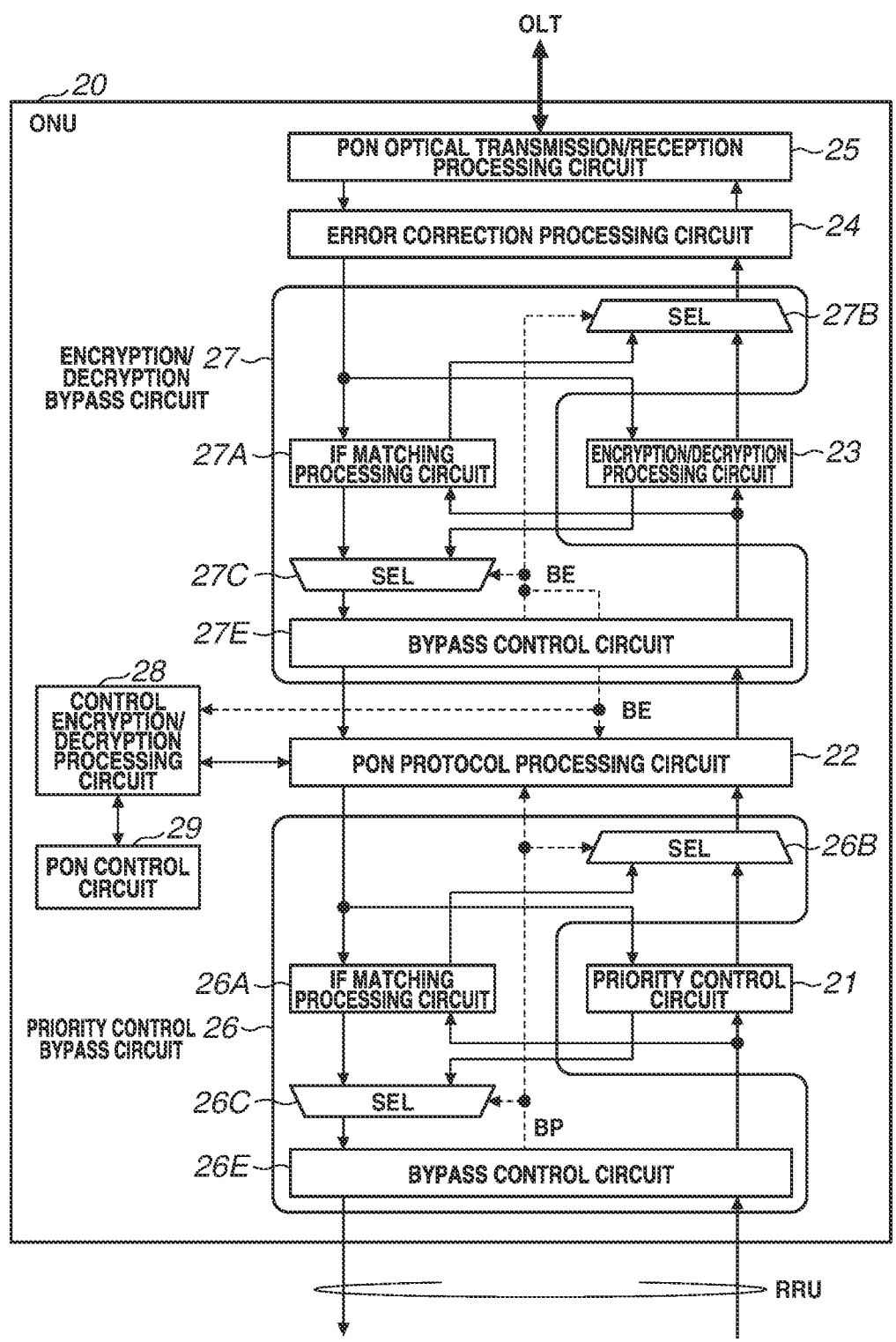
FIG. 9 is a block diagram showing the arrangement of an ONU according to the fourth embodiment.

As shown in FIG. 9, in the ONU 20 according to this embodiment, a bypass control circuit 26E is added to a priority control bypass circuit 26, as compared to FIG. 3. Similarly, a bypass control circuit 27E is added to an encryption/decryption bypass circuit 27. The bypass control circuits 26E and 27E correspond to the bypass control circuits 26D and 27D shown in FIG. 5, respectively.

The bypass control circuit 26E has a function of identifying the position of the division point of wireless protocol processes divided in advance between the CU and the RRU, based on a tag value included in downlink data output from the CU or uplink data output from the UE, and a function of generating the priority control bypass instruction BP in accordance with the obtained position of the division point and outputting the priority control bypass instruction BP to SELs 26B and 26C.

The bypass control circuit 27E has a function of identifying the position of the division point of wireless protocol processes divided in advance between the CU and the RRU, based on a tag value included in downlink data output from the CU or uplink data output from the UE, and a function of generating the encryption/decryption bypass instruction BE in accordance with the obtained position of the division point and outputting the encryption/decryption bypass instruction BE to SELs 27B and 27C.

Accordingly, the bypass control circuit 26E identifies the division point position of the wireless protocol processes based on downlink data from the CU or uplink data from the UE, and outputs the priority control bypass instruction BP according to the division point position to the SELs 26B and 26C. In addition, the bypass control circuit 27D identifies the division point position of the wireless protocol processes based on downlink data from the CU or uplink data from the UE, and outputs the encryption/decryption bypass instruction BE according to the division point position to the SELs 27B and 27C.

Note that generation processing of the bypass instruction in the bypass control circuit 26E and the bypass control circuit 27E is the same as that in the bypass control circuit 16E and the bypass control circuit 17E described above.

In addition, in a case in which the division point position of the wireless protocol processes is identified based on downlink data in the ONU, if the downlink data is encrypted, it is assumed that the division point position cannot be identified unless the downlink data is decrypted. However, when not only a function of decrypting encrypted data and transferring it but also a function of directly transferring non-encrypted data is imparted to the downlink encryption/decryption processing circuit in the ONU, and the initial state of the encryption/decryption bypass instruction BE is set to non-bypass, the division point position can be identified.

In addition, the division point may be identified based on not data from the CU or UE but control downlink data generated and transmitted by the OLT.

Note that the bypass control circuit 26E shown in FIG. 9 is arranged on the RRU side but may be arranged on the PON protocol processing circuit side.

Effect of Fourth Embodiment

As described above, in this embodiment, the bypass control circuit 16E and the bypass control circuit 26E identify the division point position of the wireless protocol processes based on the downlink data from the CU or the uplink data from the UE and generate the priority control bypass instruction BP in accordance with the division point position. In addition, the bypass control circuit 17E and the bypass control circuit 27E identify the division point position of the wireless protocol processes based on the downlink data from the CU or the uplink data from the UE and generate the encryption/decryption bypass instruction BE in accordance with the division point position.

Accordingly, in the OLT 10 or the ONU 20 according to the third embodiment, the priority control bypass instruction BP and the encryption/decryption bypass instruction BE are autonomously generated based on the division point of the wireless protocol processes divided in advance between the CU and the RRU. Hence, the priority control bypass instruction BP and the encryption/decryption bypass instruction BE need not be set in advance, and the priority control bypass instruction BP and the encryption/decryption bypass instruction BE can dynamically be changed in accordance with the operation of the system. For this reason, even in a case in which various CUs and RRUs with different function division points between the CU and the RRU are accommodated in the same PON section, reduction of a delay time according to each function division point is possible.

Fifth Embodiment

Figure 10:
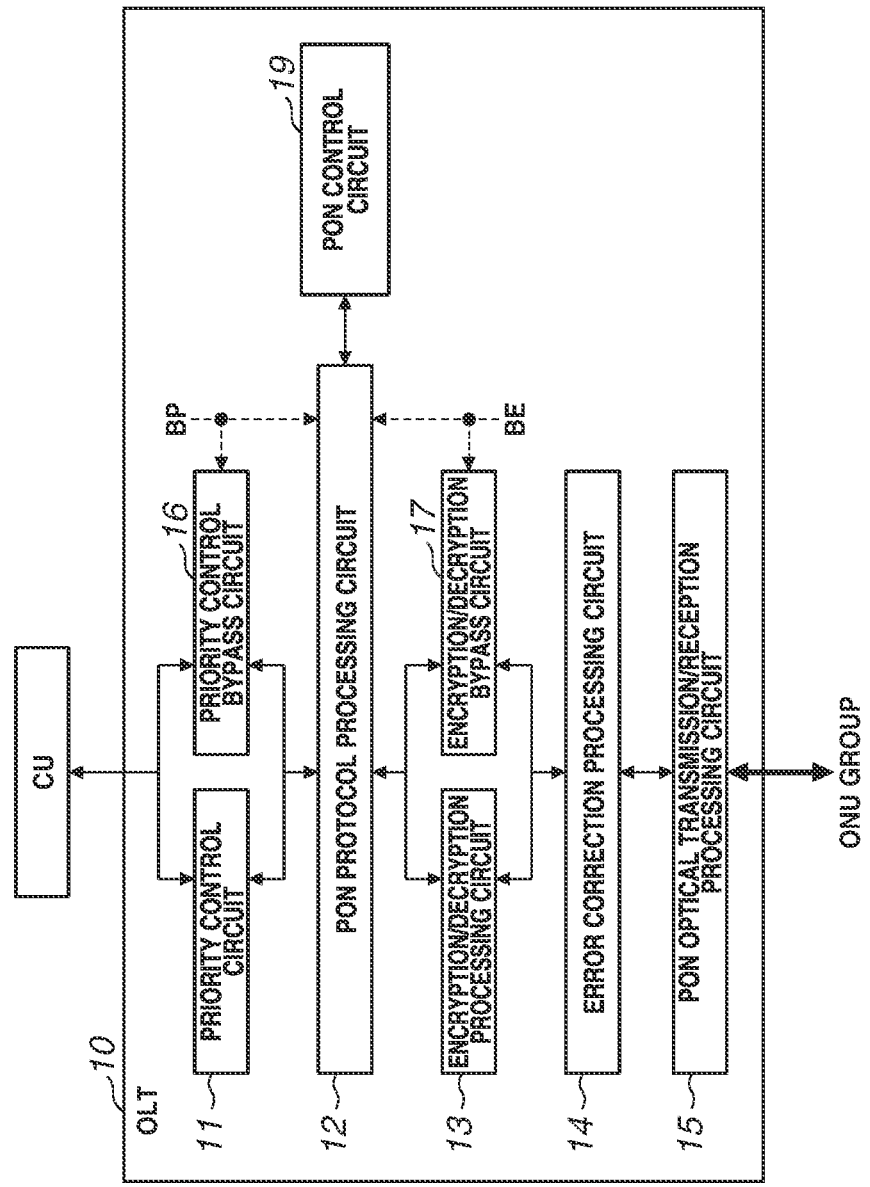
FIG. 10 is a block diagram showing the arrangement of an OLT according to the fifth embodiment.
Figure 11:
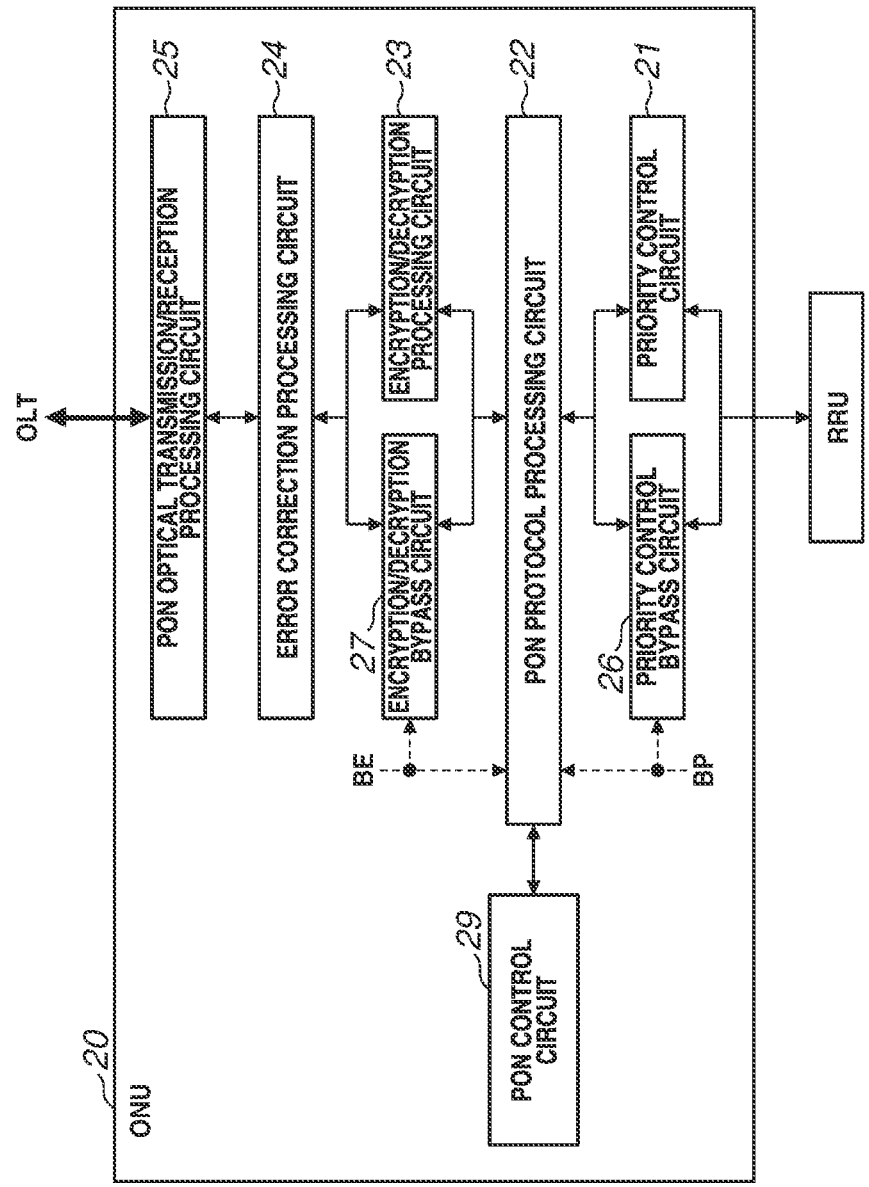
FIG. 11 is a block diagram showing the arrangement of an ONU according to the fifth embodiment.

A wireless network system 1 according to the fifth embodiment of the present invention will be described next with reference to FIGS. 10 and 11.

In this embodiment, a case in which not NG-PON2 explained in the third embodiment but a protocol formed by SIEPON (Service Interoperability in Ethernet Passive Optical. Networks) defined by IEEE 1904.1 is used for encryption/decryption and priority control concerning control data exchanged between an OLT 10 and an ONU 20 will be described.

This embodiment is different from the third embodiment in that data and control data are exchanged using separate frames between the OLT 10 and the ONU 20. In addition, since encryption of control data (control frame) is not essential, PON protocol processing circuits 12 and 22 need not add decryption information to the control frame to be output, and control encryption/decryption processing circuits need not be provided.

The rest of the arrangements of the OLT 10 and the ONU 20 according to this embodiment is the same as in the above-described third embodiment, and a description thereof will be omitted here.

Operation of Fifth Embodiment

The operation of a PON system 2 according to this embodiment will be described next with reference to FIGS. 10 and 11. The operations of the OLT 10 and the ONU 20 will be described here for each combination of bypass for encryption/decryption processing and priority control processing. A case of using the SIEPON defined by IEEE 1904.1 as the PON protocol will be described below as an example.

[Case of Bypassing Both Encryption/Decryption Processing and Priority Control Processing]

OLT: Uplink Direction

In the OLT 10, the PON protocol processing circuit 12 receives an uplink frame and an uplink control frame (MPCP frame/OAM frame or the like) from an encryption/decryption bypass circuit 17. Of these frames, the uplink control frame is output to a PON control circuit 19, and the uplink frame other than the uplink control frame is output to the host device (CU) side.

Accordingly, the uplink control frame is used for control of the PON system 2 by the PON control circuit 19. In addition, the uplink frame other than the uplink control frame is output from the OLT 10 to the host device side via a priority control bypass circuit 16.

OLT: Downlink Direction

In the OLT 10, the PON protocol processing circuit 12 acquires a downlink frame from the priority control bypass circuit 16 and a downlink control frame output from the PON control circuit 19, and outputs them to the PON side.

Accordingly, the downlink frame and the downlink control frame are output to an error correction processing circuit 14 via the encryption/decryption bypass circuit 17. At this time, which one of the downlink frame from the priority control bypass circuit 16 and the downlink control frame should be preferentially output by the PON protocol processing circuit 12 can arbitrarily be decided. However, the downlink control frame may be preferentially output.

Note that the output of the downlink control frame and the output of the downlink frame from the priority control bypass circuit 16 cannot be simultaneously performed. Hence, a buffer for the downlink frame from the priority control bypass circuit 16 needs to be provided in the PON protocol processing circuit 12. Alternatively, a function of permitting the priority control bypass circuit 16 to do output needs to be provided in the PON protocol processing circuit 12, thereby permitting the priority control bypass circuit 16 to do output only when outputting the downlink frame from the priority control bypass circuit 16. In the latter case, a buffer is provided in the priority control bypass circuit 16, and when the priority control bypass circuit 16 receives an output permission input from the PON protocol processing circuit 12, the frame is output from the buffer.

ONU: Uplink Direction

In the ONU 20, the PON protocol processing circuit 22 acquires an uplink frame from a priority control bypass circuit 26 and an uplink control frame output from a PON control circuit 29, and outputs them to the PON side for each LLID (Logical Link. ID).

Accordingly, the uplink frame from the priority control bypass circuit 26 and the uplink control frame are output to an error correction processing circuit 24 via an encryption/decryption bypass circuit 27. At this time, which one of the uplink frame from the priority control bypass circuit 26 and the uplink control frame should be preferentially output by the PON protocol processing circuit 22 can arbitrarily be decided. However, the uplink control frame may be preferentially output.

Note that the output of the uplink control frame and the output of the uplink frame from the priority control bypass circuit 26 cannot be simultaneously performed. Hence, a buffer for the uplink frame from the priority control bypass circuit 26 needs to be provided in the PON protocol processing circuit 22 for each LLID. Alternatively, a function of permitting the priority control bypass circuit 26 to do output (and a function of outputting the information of LLID permitted to output) needs to be provided in the PON protocol processing circuit 22, thereby permitting the priority control bypass circuit 26 to do output only when outputting the uplink frame from the priority control bypass circuit 26. In the latter case, a buffer is provided in the priority control bypass circuit 26 for each LLID, and when the priority control bypass circuit 26 receives an output permission (and the information of permitted LLID) input from the PON protocol processing circuit 22, the frame is output from the buffer of the permitted LLID.

ONU: Downlink Direction

In the ONU 20, the PON protocol processing circuit 22 receives a downlink frame and a downlink control frame from the encryption/decryption bypass circuit 27. Of these frames, the downlink control frame is output to the PON control circuit 29, and the downlink frame other than the downlink control frame is output to the user terminal side.

Accordingly, the downlink control frame is used for control of the PON system 2 by the PON control circuit 29. In addition, the downlink frame other than the downlink control frame is output from the ONU 20 to the user terminal side via the priority control bypass circuit 26.

[Case of Bypassing Only Encryption/Decryption Processing]

OLT: Uplink Direction

In the OLT 10, the PON protocol processing circuit 12 receives an uplink frame and an uplink control frame from the encryption/decryption bypass circuit 17. Of these frames, the uplink control frame is output to the PON control circuit 19, and the uplink frame other than the uplink control frame is output to the host device (CU) side.

Accordingly, the uplink control frame is used for control of the PON system 2 by the PON control circuit 19. In addition, the uplink frame other than the uplink control frame is output from the OLT 10 to the host device side via a priority control circuit 11.

OLT: Downlink Direction

In the OLT 10, the PON protocol processing circuit 12 acquires a downlink frame from the priority control circuit 11 and a downlink control frame output from the PON control circuit 19, and outputs them to the PON side in accordance with the priority.

Accordingly, the downlink frame from the priority control circuit 11 and the downlink control frame are output to the error correction processing circuit 14 via the encryption/decryption bypass circuit 17.

Note that since the priority of a frame needs to be taken into consideration, a buffer for each priority needs to be provided in the PON protocol processing circuit 12, and priority is given to the output from a buffer of a higher priority. Alternatively, a function of permitting the priority control circuit 11 to do output needs to be provided in the PON protocol processing circuit 12, thereby permitting the priority control circuit 11 to do output only when outputting the downlink frame from the priority control circuit 11. In the latter case, a buffer for each priority in the priority control circuit 11 is used, and when the priority control circuit 11 receives an output permission input from the PON protocol processing circuit 12, the output from a buffer of a higher priority is preferentially output.

ONU: Uplink Direction

In the ONU 20, the PON protocol processing circuit 22 acquires an uplink frame from a priority control circuit 21 and an uplink control frame output from the PON control circuit 29, and outputs them to the PON side for each LLID.

Accordingly, the uplink frame from the priority control circuit 21 and the uplink control frame are output to the error correction processing circuit 24 via the encryption/decryption bypass circuit 27. At this time, concerning which one of the uplink frame from the priority control circuit 21 and the uplink control frame should be preferentially output by the PON protocol processing circuit 22, the priority of the frame needs to be taken into consideration.

Hence, a buffer for each priority needs to be provided in the PON protocol processing circuit 22 for each LLID to give priority to the output from a buffer of a higher priority. Alternatively, a function of permitting the priority control circuit 21 to do output (and a function of outputting the information of LLID permitted to output) needs to be provided in the PON protocol processing circuit 22, thereby permitting the priority control circuit 21 to do output only when outputting the uplink frame from the priority control circuit 21.

In the latter case, a buffer for each priority is provided in the priority control circuit 21 for each LLID, and when the priority control circuit 21 receives an output permission (and the information of permitted LLID) input from the PON protocol processing circuit 22, the output from a buffer of a higher priority of the permitted LLID is preferentially output.

Note that in both the former case and the latter case, when selectively using the LLID for each priority, the buffer for each priority need not be provided for each LLID, and the frame to be output (the frame to be output from the priority control circuit 21 in the latter case) can be decided based on only the LLID.

ONU: Downlink Direction

In the ONU 20, the PON protocol processing circuit 22 receives a downlink frame and a downlink control frame from the encryption/decryption bypass circuit 27. Of these frames, the downlink control frame is output to the PON control circuit 29, and the downlink frame other than the downlink control frame is output to the user terminal side.

Accordingly, the downlink control frame is used for control of the PON system 2 by the PON control circuit 29. In addition, the downlink frame other than the downlink control frame is output from the ONU 20 to the user terminal side via the priority control circuit 21.

[Case of Bypassing Neither Encryption/Decryption Processing Nor Priority Control Processing]

OLT: Uplink Direction

In the OLT 10, the PON protocol processing circuit 12 receives an uplink frame and an uplink control frame from the encryption/decryption processing circuit 13. Of these frames, the uplink control frame is output to the PON control circuit 19, and the uplink frame other than the uplink control frame is output to the host device (CU) side.

Accordingly, the uplink control frame is used for control of the PON system 2 by the PON control circuit 19. In addition, the uplink frame other than the uplink control frame is output from the OLT 10 to the host device side via the priority control circuit 11.

OLT: Downlink Direction

In the OLT 10, the PON protocol processing circuit 12 acquires a downlink frame from the priority control circuit 11 and a downlink control frame output from the PON control circuit 19, and outputs them to the PON side based on the priority.

Accordingly, the downlink frame from the priority control circuit 11 and the downlink control frame are output to the error correction processing circuit 14 via the encryption/decryption processing circuit 13. At this time, concerning which one of the downlink frame and the downlink control frame should be preferentially output by the PON protocol processing circuit 12, the priority of the frame needs to be taken into consideration.

Hence, a buffer for each priority needs to be provided in the PON protocol processing circuit 12 to give priority to the output from a buffer of a higher priority. Alternatively, a function of permitting the priority control circuit 11 to do output needs to be provided in the PON protocol processing circuit 12, thereby permitting the priority control circuit 11 to do output only when outputting the downlink frame from the priority control circuit 11. In the latter case, a buffer for each priority in the priority control circuit 11 is used, and when the priority control circuit 11 receives an output permission input from the PON protocol processing circuit 12, the output from a buffer of a higher priority is preferentially output.

ONU: Uplink Direction

In the ONU 20, the PON protocol processing circuit 22 acquires an uplink frame from a priority control circuit 21 and an uplink control frame output from the PON control circuit 29, and outputs them to the PON side for each LLID.

Accordingly, the uplink frame from the priority control circuit 21 and the uplink control frame are output to the error correction processing circuit 24 via the encryption/decryption processing circuit 23. At this time, concerning which one of the uplink frame and the uplink control frame should be preferentially output by the PON protocol processing circuit 22, the priority of the frame needs to be taken into consideration.

Hence, a buffer for each priority needs to be provided in the PON protocol processing circuit 22 for each LLID to give priority to the output from a buffer of a higher priority. Alternatively, a function of permitting the priority control circuit 21 to do output (and a function of outputting the information of LLID permitted to output) needs to be provided in the PON protocol processing circuit 22, thereby permitting the priority control circuit 21 to do output only when outputting the uplink frame from the priority control circuit 21.

In the latter case, a buffer for each priority is provided in the priority control circuit 21 for each LLID, and when the priority control circuit 21 receives an output permission (and the information of permitted LLID) input from the PON protocol processing circuit 22, the output from a buffer of a higher priority of the permitted LLID is preferentially output.

Note that in both the former case and the latter case, when selectively using the LLID for each priority, the buffer for each priority need not be provided for each LLID, and the frame to be output (the frame to be output from the priority control circuit 21 in the latter case) can be decided based on only the LLID.

ONU: Downlink Direction

In the ONU 20, the PON protocol processing circuit 22 receives a downlink frame and a downlink control frame from the encryption/decryption processing circuit 23. Of these frames, the downlink control frame is output to the PON control circuit 29, and the downlink frame other than the downlink control frame is output to the user terminal side.

Accordingly, the downlink control frame is used for control of the PON system 2 by the PON control circuit 29. In addition, the downlink frame other than the downlink control frame is output from the OLT 10 to the host device side via the priority control circuit 21.

Effect of Fifth Embodiment

As described above, according to this embodiment, even if the SIEPON defined by IEEE 1904.1 is used as the PON protocol, the same effect as in the third embodiment can be obtained.

Note that when the SIEPON is used, encryption of a control frame is not essential. When performing encryption of the control frame, a control encryption/decryption processing circuit is provided as in the third embodiment, thereby obtaining the same effect as in the third embodiment. In this case, the PON protocol processing circuit needs to have a function of outputting information and decryption information to be used for encryption, as in the third embodiment, depending on the encryption method.

Sixth Embodiment

A wireless network system 1 according to the sixth embodiment of the present invention will be described next with reference to FIGS. 12 and 13.

In this embodiment, the arrangement position of a PON protocol processing circuit 12 in an OLT 10 and the arrangement position of a PON protocol processing circuit 22 in an ONU 20 will be described.

In the third embodiment, as shown in FIG. 6, a case in which the PON protocol processing circuit 12 in the OLT 10 is arranged between the priority control circuit 11 and the encryption/decryption processing circuit 13, and the PON protocol processing circuit 22 in the ONU 20 is arranged between the priority control circuit 21 and the encryption/decryption processing circuit 23 has been described as an example.

Figure 12:
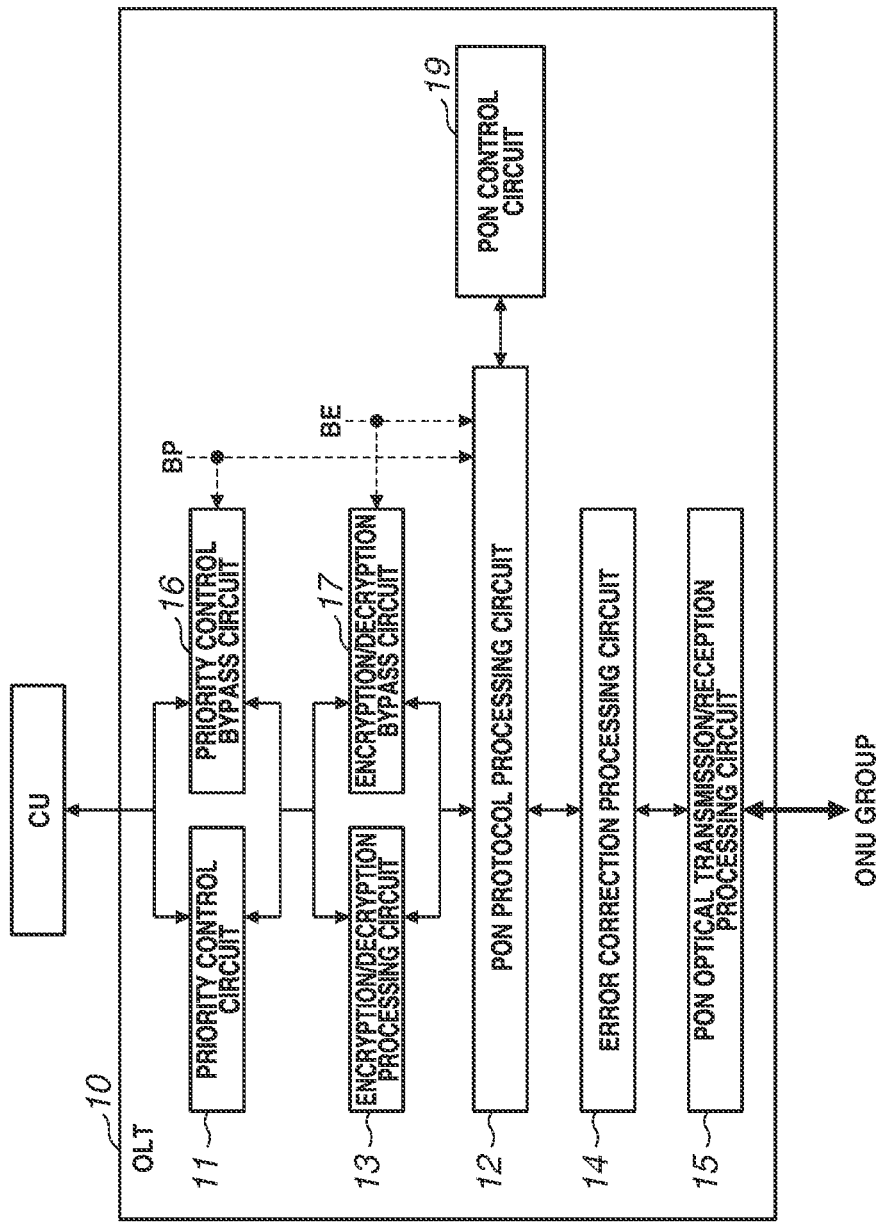
FIG. 12 is a block diagram showing the arrangement of an OLT according to the sixth embodiment.
Figure 13:
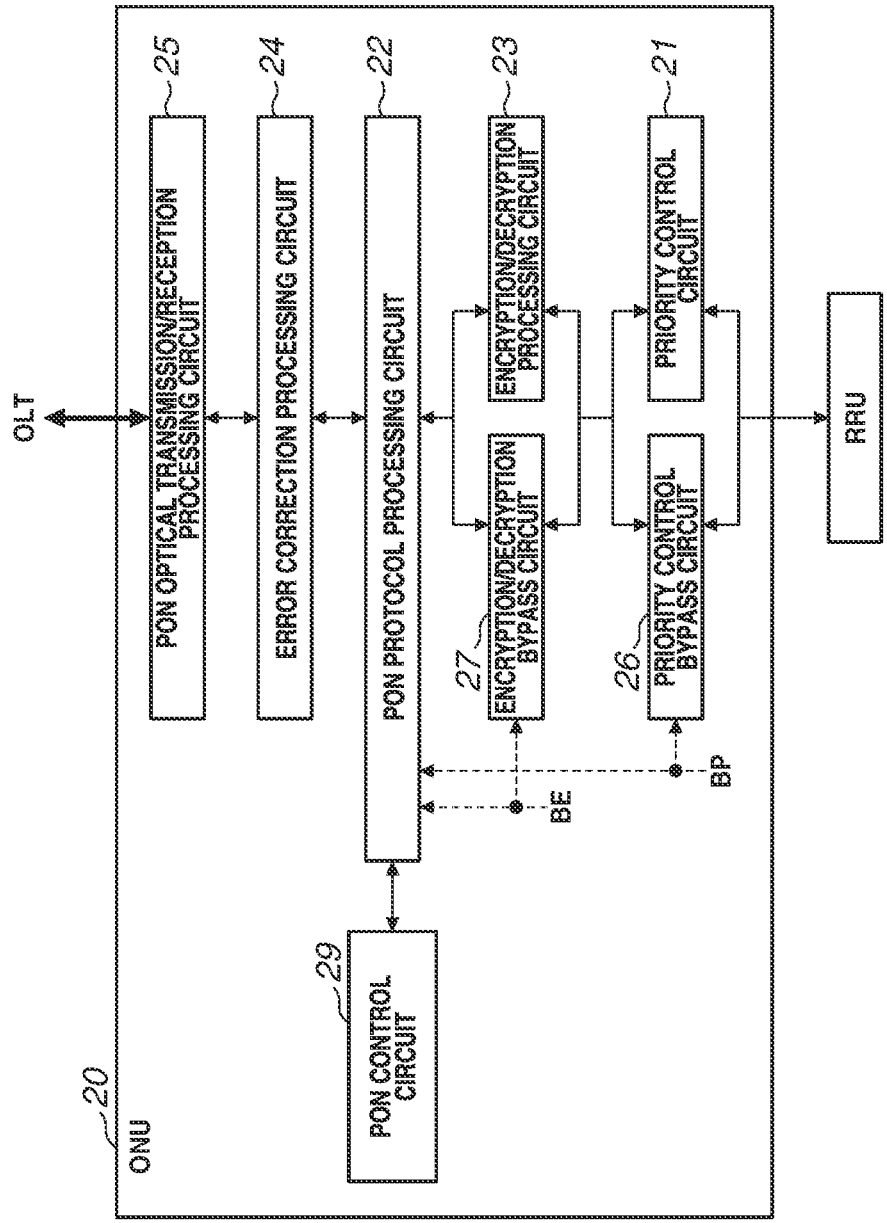
FIG. 13 is a block diagram showing the arrangement of an ONU according to the sixth embodiment.

In this embodiment, the PON protocol processing circuit 12 is arranged between an encryption/decryption processing circuit 13 and an error correction processing circuit 14, as shown in FIG. 12, and the PON protocol processing circuit 22 is arranged between an encryption/decryption processing circuit 23 and an error correction processing circuit 24, as shown in FIG. 13.

The rest of the arrangements of the OLT 10 and the ONU 20 according to this embodiment is the same as in the above-described fifth embodiment, and a description thereof will be omitted here.

Operation of Sixth Embodiment

The operation of a PON system 2 according to this embodiment will be described next with reference to FIGS. 12 and 13. The operations of the OLT 10 and the ONU 20 will be described here for each combination of bypass for encryption/decryption processing and priority control processing. A case of using a PON protocol formed by SIEPON defined by IEEE 1904.1, as in the fifth embodiment, will be described below.

[Case of Bypassing Both Encryption/Decryption Processing and Priority Control Processing]

OLT: Uplink Direction

In the OLT 10, the PON protocol processing circuit 12 receives an uplink frame and an uplink control frame (MPCP frame/OAM frame or the like) from the error correction processing circuit 14. Of these frames, the uplink control frame is output to a PON control circuit 19, and the uplink frame other than the uplink control frame is output to the host device (CU) side.

Accordingly, the uplink control frame is used for control of the PON system 2 by the PON control circuit 19. In addition, the uplink frame other than the uplink control frame is output from the OLT 10 to the host device side via an encryption/decryption bypass circuit 17 and a priority control bypass circuit 16.

OLT: Downlink Direction

In the OLT 10, the PON protocol processing circuit 12 acquires a downlink frame from the encryption/decryption bypass circuit 17 and a downlink control frame output from the PON control circuit 19, and outputs them to the PON side.

Accordingly, the downlink frame from the encryption/decryption bypass circuit 17 and the downlink control frame are output to the error correction processing circuit 14. At this time, which one of the downlink frame from the encryption/decryption bypass circuit 17 and the downlink control frame should be preferentially output by the PON protocol processing circuit 12 can arbitrarily be decided. However, the downlink control frame may be preferentially output.

Note that the output of the downlink control frame and the output of the downlink frame from the encryption/decryption bypass circuit 17 cannot be simultaneously performed. Hence, a buffer for the downlink frame from the encryption/decryption bypass circuit 17 needs to be provided in the PON protocol processing circuit 12. Alternatively, a function of permitting the priority control bypass circuit 16 to do output needs to be provided in the PON protocol processing circuit 12, thereby permitting the priority control bypass circuit 16 to do output only when outputting the downlink frame from the priority control bypass circuit 16.

In the latter case, a buffer is provided in the priority control bypass circuit 16, and when the priority control bypass circuit 16 receives an output permission input from the PON protocol processing circuit 12, the frame is output from the buffer. Alternatively, instead of providing a buffer in the priority control bypass circuit 16, a function of permitting the encryption/decryption bypass circuit 17 to do output may be provided in the PON protocol processing circuit 12 so as to permit the encryption/decryption bypass circuit 17 to do output only when outputting the downlink frame from the encryption/decryption bypass circuit 17. A buffer may be provided in the encryption/decryption bypass circuit 17, and when the encryption/decryption bypass circuit 17 receives the output permission input from the PON protocol processing circuit 12, the frame may be output from the buffer.

ONU: Uplink Direction

In the ONU 20, the PON protocol processing circuit 22 acquires an uplink data from an encryption/decryption bypass circuit 27 and uplink control data output from a PON control circuit 29, and outputs them to the PON side for each LLID.

Accordingly, the uplink frame from the encryption/decryption bypass circuit 27 and the uplink control frame are output to an error correction processing circuit 24. At this time, which one of the uplink frame and the uplink control frame should be preferentially output by the PON protocol processing circuit 22 can arbitrarily be decided. However, the uplink control frame may be preferentially output.

Note that the output of the uplink control frame and the output of the uplink frame from the encryption/decryption bypass circuit 27 cannot be simultaneously performed. Hence, a buffer for the uplink frame from the encryption/decryption bypass circuit 27 needs to be provided in the PON protocol processing circuit 22 for each LLID. Alternatively, a function of permitting a priority control bypass circuit 26 to do output (and a function of outputting the information of LLID permitted to output) needs to be provided in the PON protocol processing circuit 22, thereby permitting the priority control bypass circuit 26 to do output only when outputting the uplink frame from the priority control bypass circuit 26.

In the latter case, a buffer is provided in the priority control bypass circuit 26 for each LLID, and when the priority control bypass circuit 26 receives an output permission (and the information of permitted LLID) input from the PON protocol processing circuit 22, the frame is output from the buffer of the permitted LLID. Alternatively, instead of providing a buffer in the priority control bypass circuit 26, a function of permitting the encryption/decryption bypass circuit 27 to do output (and a function of outputting the information of LLID permitted to output) may be provided in the PON protocol processing circuit 22 so as to permit the encryption/decryption bypass circuit 27 to do output only when outputting the uplink frame from the encryption/decryption bypass circuit 27. A buffer may be provided in the encryption/decryption bypass circuit 27 for each LLID, and when the encryption/decryption bypass circuit 27 receives the output permission (and the information of permitted LLID) input from the PON protocol processing circuit 22, the frame may be output from the buffer of the permitted LLID.

ONU: Downlink Direction

In the ONU 20, the PON protocol processing circuit 22 receives a downlink frame and a downlink control frame from the error correction processing circuit 24. Of these frames, the downlink control frame is output to the PON control circuit 29, and the downlink frame other than the downlink control frame is output to the user terminal side.

Accordingly, the downlink control frame is used for control of the PON system 2 by the PON control circuit 29. In addition, the downlink frame other than the downlink control frame is output from the ONU 20 to the user terminal side via the encryption/decryption bypass circuit 27 and the priority control bypass circuit 26.

[Case of Bypassing Only Encryption/Decryption Processing]

OLT: Uplink Direction

In the OLT 10, the PON protocol processing circuit 12 receives an uplink frame and an uplink control frame from the error correction processing circuit 14. Of these frames, the uplink control frame is output to the PON control circuit 19, and the uplink frame other than the uplink control frame is output to the host device (CU) side.

Accordingly, the uplink control frame is used for control of the PON system 2 by the PON control circuit 19. In addition, the uplink frame other than the uplink control frame is output from the OLT 10 to the host device side via the encryption/decryption bypass circuit 17 and a priority control circuit 11.

OLT: Downlink Direction

In the OLT 10, the PON protocol processing circuit 12 acquires a downlink frame from the encryption/decryption bypass circuit 17 and a downlink control frame output from the PON control circuit 19, and outputs them to the PON side in accordance with the priority. Accordingly, the downlink frame from the encryption/decryption bypass circuit 17 and the downlink control frame are output to the error correction processing circuit 14.

Note that since the priority of a frame needs to be taken into consideration, a buffer for each priority needs to be provided in the PON protocol processing circuit 12, and priority is given to the output from a buffer of a higher priority. Alternatively, a function of permitting the priority control circuit 11 to do output needs to be provided in the PON protocol processing circuit 12, thereby permitting the priority control circuit 11 to do output only when outputting the downlink frame from the priority control circuit 11.

In the latter case, a buffer for each priority in the priority control circuit 11 is used, and when the priority control circuit 11 receives an output permission input from the PON protocol processing circuit 12, the output from a buffer of a higher priority is preferentially output. Alternatively, a function of permitting the encryption/decryption bypass circuit 17 to do output may be provided in the PON protocol processing circuit 12 so as to permit the encryption/decryption bypass circuit 17 to do output only when outputting the downlink frame from the encryption/decryption bypass circuit 17. A buffer for each priority may be provided in the encryption/decryption bypass circuit 17, and when the encryption/decryption bypass circuit 17 receives an output permission input from the PON protocol processing circuit 12, the output from a buffer of a higher priority may be preferentially output.

ONU: Uplink Direction

In the ONU 20, the PON protocol processing circuit 22 acquires an uplink frame from the encryption/decryption bypass circuit 27 and an uplink control frame output from the PON control circuit 29, and outputs them to the PON side for each LLID.

Accordingly, the uplink frame from the encryption/decryption bypass circuit 27 and the uplink control frame are output to the error correction processing circuit 24. At this time, concerning which one of the uplink frame from the encryption/decryption bypass circuit 27 and the uplink control frame should be preferentially output by the PON protocol processing circuit 22, the priority of the frame needs to be taken into consideration.

Hence, a buffer for each priority needs to be provided in the PON protocol processing circuit 22 for each LLID to give priority to the output from a buffer of a higher priority. Alternatively, a function of permitting a priority control circuit 21 to do output (and a function of outputting the information of LLID permitted to output) needs to be provided in the PON protocol processing circuit 22, thereby permitting the priority control circuit 21 to do output only when outputting the uplink frame from the priority control circuit 21.

In the latter case, a buffer for each priority is provided in the priority control circuit 21 for each LLID, and when the priority control circuit 21 receives an output permission (and the information of permitted LLID) input from the PON protocol processing circuit 22, the output from a buffer of a higher priority of the permitted LLID is preferentially output.

Note that in both the former case and the latter case, when selectively using the LLID for each priority, the buffer for each priority need not be provided for each LLID, and the frame to be output (the frame to be output from the priority control circuit 21 in the latter case) can be decided based on only the LLID.

Alternatively, a function of permitting the encryption/decryption bypass circuit 27 to do output (and a function of outputting the information of LLID permitted to output) may be provided in the PON protocol processing circuit 22 so as to permit the encryption/decryption bypass circuit 27 to do output only when outputting the uplink frame from the encryption/decryption bypass circuit 27. A buffer for each priority may be provided in the encryption/decryption bypass circuit 27 for each LLID, and when the encryption/decryption bypass circuit 27 receives the output permission (and the information of permitted LLID) input from the PON protocol processing circuit 22, the output from a buffer of a higher priority of the permitted LLID may be preferentially output. In this case as well, when selectively using the LLID for each priority, the buffer for each priority need not be provided for each LLID, and the frame to be output from the encryption/decryption bypass circuit 27 can be decided based on only the LLID.

ONU: Downlink Direction

In the ONU 20, the PON protocol processing circuit 22 receives a downlink frame and a downlink control frame from the error correction processing circuit 24. Of these frames, the downlink control frame is output to the PON control circuit 29, and the downlink frame other than the downlink control frame is output to the user terminal side.

Accordingly, the downlink control frame is used for control of the PON system 2 by the PON control circuit 29. In addition, the downlink frame other than the downlink control frame is output from the ONU 20 to the user terminal side via the encryption/decryption bypass circuit 27 and the priority control circuit 21.

[Case of Bypassing Neither Encryption/Decryption Processing Nor Priority Control Processing]

OLT: Uplink Direction

In the OLT 10, the PON protocol processing circuit 12 receives an uplink frame and an uplink control frame from the error correction processing circuit 14. Of these frames, the uplink control frame is output to the PON control circuit 19, and the uplink frame other than the uplink control frame is output to the host device (CU) side.

Accordingly, the uplink control frame is used for control of the PON system 2 by the PON control circuit 19. In addition, the uplink frame other than the uplink control frame is output from the OLT 10 to the host device side via the encryption/decryption processing circuit 13 and the priority control circuit 11.

OLT: Downlink Direction

In the OLT 10, the PON protocol processing circuit 12 acquires a downlink frame from the encryption/decryption processing circuit 13 and a downlink control frame output from the PON control circuit 19, and outputs them to the PON side in accordance with the priority.

Accordingly, the downlink frame from the encryption/decryption processing circuit 13 and the downlink control frame are output to the error correction processing circuit 14.

Note that since the priority of the frame needs to be taken into consideration, a buffer for each priority needs to be provided in the PON protocol processing circuit 12 to give priority to the output from a buffer of a higher priority. Alternatively, a function of permitting the priority control circuit 11 to do output needs to be provided in the PON protocol processing circuit 12, thereby permitting the priority control circuit 11 to do output only when outputting the downlink frame from the priority control circuit 11.

In the latter case, a buffer for each priority in the priority control circuit 11 is used, and when the priority control circuit 11 receives an output permission input from the PON protocol processing circuit 12, the output from a buffer of a higher priority is preferentially output. Alternatively, a function of permitting the encryption/decryption processing circuit 13 to do output may be provided in the PON protocol processing circuit 12 so as to permit the encryption/decryption processing circuit 13 to do output only when outputting the downlink frame from the encryption/decryption processing circuit 13. A buffer for each priority may be provided in the encryption/decryption processing circuit 13, and when the encryption/decryption processing circuit 13 receives an output permission input from the PON protocol processing circuit 12, the output from a buffer of a higher priority may be preferentially output.

ONU: Uplink Direction

In the ONU 20, the PON protocol processing circuit 22 acquires an uplink frame from the encryption/decryption processing circuit 23 and an uplink control frame output from the PON control circuit 29, and outputs them to the PON side for each LLID.

Accordingly, the uplink frame from the encryption/decryption processing circuit 23 and the uplink control frame are output to the error correction processing circuit 24. At this time, concerning which one of the uplink frame and the uplink control frame should be preferentially output by the PON protocol processing circuit 22, the priority of the frame needs to be taken into consideration.

Hence, a buffer for each priority needs to be provided in the PON protocol processing circuit 22 for each LLID to give priority to the output from a buffer of a higher priority. Alternatively, a function of permitting the priority control circuit 21 to do output (and a function of outputting the information of LLID permitted to output) needs to be provided in the PON protocol processing circuit 22, thereby permitting the priority control circuit 21 to do output only when outputting the uplink frame from the priority control circuit 21.

In the latter case, a buffer for each priority is provided in the priority control circuit 21 for each LLID, and when the priority control circuit 21 receives an output permission (and the information of permitted LLID) input from the PON protocol processing circuit 22, the output from a buffer of a higher priority of the permitted LLID is preferentially output.

Note that in both the former case and the latter case, when selectively using the LLID for each priority, the buffer for each priority need not be provided for each LLID, and the frame to be output (the frame to be output from the priority control circuit 21 in the latter case) can be decided based on only the LLID.

Alternatively, a function of permitting the encryption/decryption processing circuit 23 to do output (and a function of outputting the information of LLID permitted to output) may be provided in the PON protocol processing circuit 22 so as to permit the encryption/decryption processing circuit 23 to do output only when outputting the uplink frame from the encryption/decryption processing circuit 23. A buffer for each priority may be provided in the encryption/decryption processing circuit 23 for each LLID, and when the encryption/decryption processing circuit 23 receives the output permission (and the information of permitted LLID) input from the PON protocol processing circuit 22, the output from a buffer of a higher priority of the permitted LLID may be preferentially output. In this case as well, when selectively using the LLID for each priority, the buffer for each priority need not be provided for each LLID, and the frame to be output from the encryption/decryption processing circuit 23 can be decided based on only the LLID.

ONU: Downlink Direction

In the ONU 20, the PON protocol processing circuit 22 receives a downlink frame and a downlink control frame from the encryption/decryption processing circuit 23. Of these frames, the downlink control frame is output to the PON control circuit 29, and the downlink frame other than the downlink control frame is output to the user terminal side.

Accordingly, the downlink control frame is used for control of the PON system 2 by the PON control circuit 29. In addition, the downlink frame other than the downlink control frame is output from the ONU 20 to the user terminal side via the encryption/decryption processing circuit 23 and the priority control circuit 21.

Effect of Sixth Embodiment

As described above, according to this embodiment, even in a case in which the PON protocol processing circuit 12 is arranged between the encryption/decryption processing circuit 13 and the error correction processing circuit 14 in the OLT 10, and the PON protocol processing circuit 22 is arranged between the encryption/decryption processing circuit 23 and the error correction processing circuit 24 in the ONU 20, the same effect as in the fifth embodiment can be obtained.

Note that when the SIEPON is used, encryption of a control frame is not essential. When performing encryption of the control frame, a control encryption/decryption processing circuit as in the third embodiment is provided between the PON protocol processing circuit and the PON control circuit, thereby obtaining the same effect as in the third embodiment. In this case, the PON protocol processing circuit needs to have a function of outputting information and decryption information to be used for encryption, as in the third embodiment, depending on the encryption method.

Seventh Embodiment

A wireless network system 1 according to the seventh embodiment of the present invention will be described next with reference to FIGS. 14 and 15.

In this embodiment, control data exchange in a case in which a plurality of optical signals of different wavelengths are used in OMCC defined by ITU-T G989.3 (NG-PON2) described in the third embodiment will be described.

Figure 14:
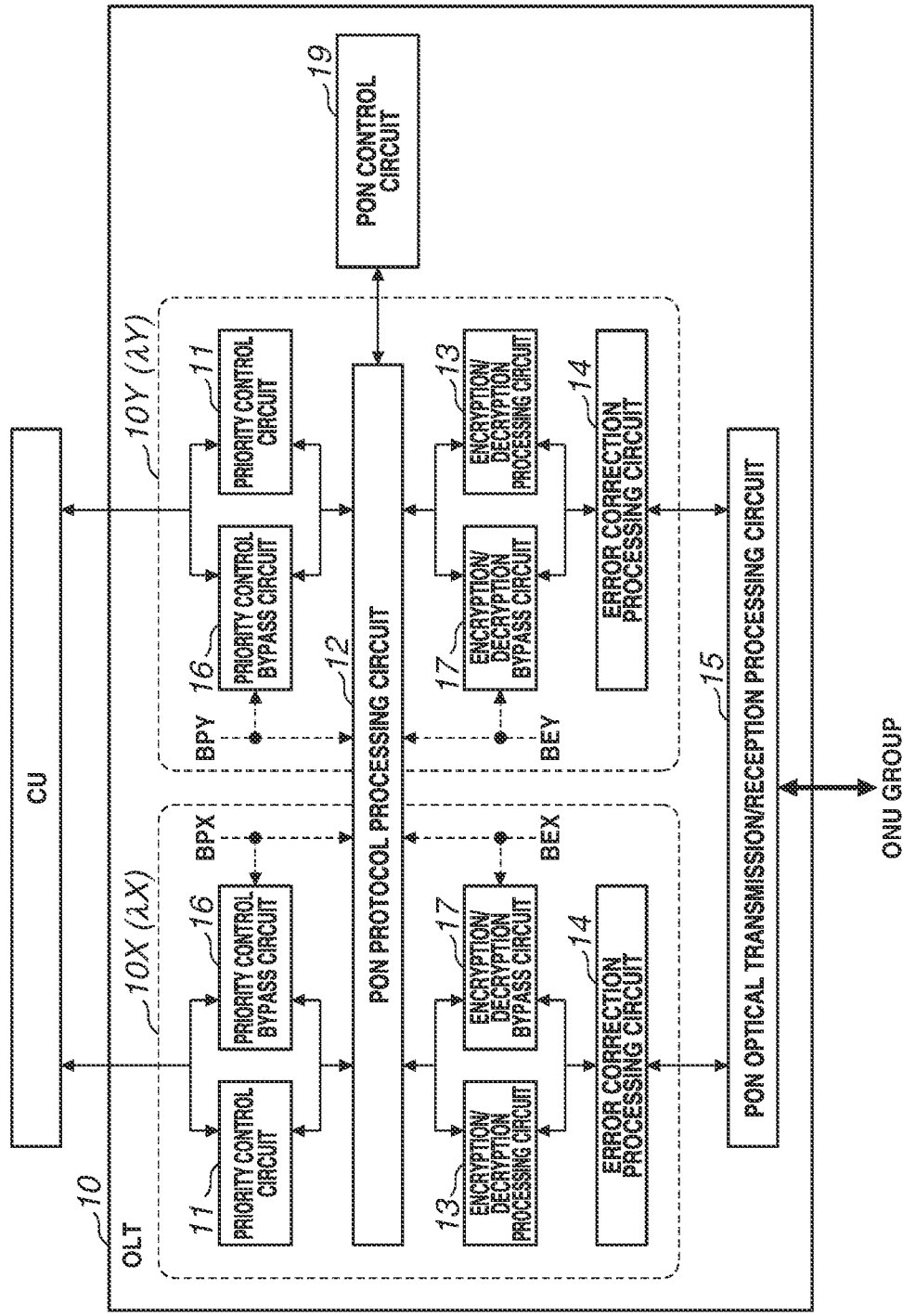
FIG. 14 is a block diagram showing the arrangement of an OLT according to the seventh embodiment.

FIG. 14 shows an example of an arrangement in a case in which an OLT 10 uses two optical signals of different wavelengths $\lambda X$ and $\lambda Y$. A PON possessing circuit 10X has a function of performing optical commendation using the optical signal of the wavelength $\lambda X$, and a PON possessing circuit 10Y has a function of performing optical commendation using the optical signal of the wavelength $\lambda Y$.

Each of the PON possessing circuits 10X and 10Y includes a priority control circuit 11, an encryption/decryption processing circuit 13, an error correction processing circuit 14, a priority control bypass circuit 16, and an encryption/decryption bypass circuit 17. In addition, a PON protocol processing circuit 12 and a PON optical transmission/reception processing circuit 15 are provided commonly to the PON possessing circuits 10X and 10Y.

Figure 15:
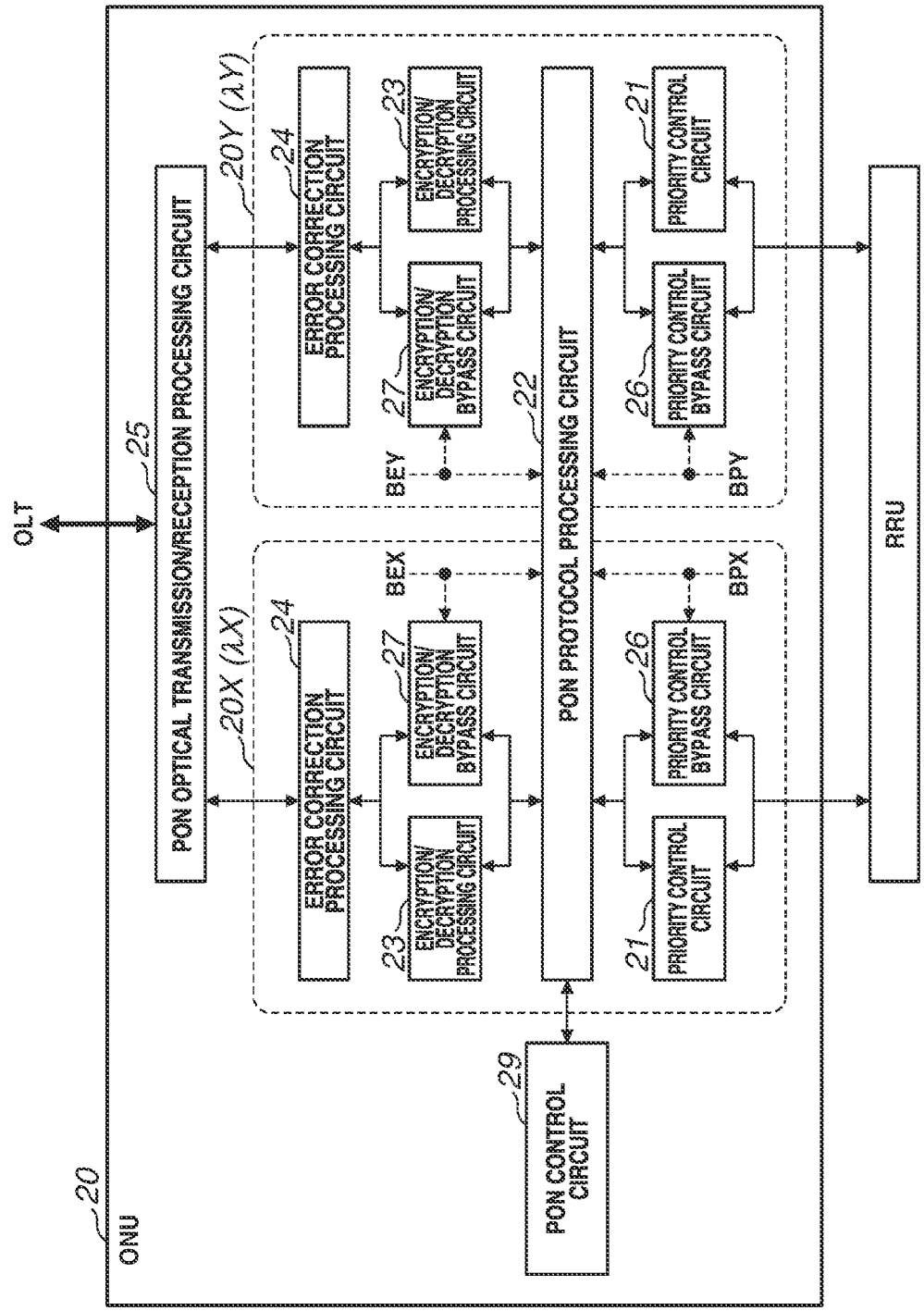
FIG. 15 is a block diagram showing the arrangement of an ONU according to the seventh embodiment.
Figure 16:
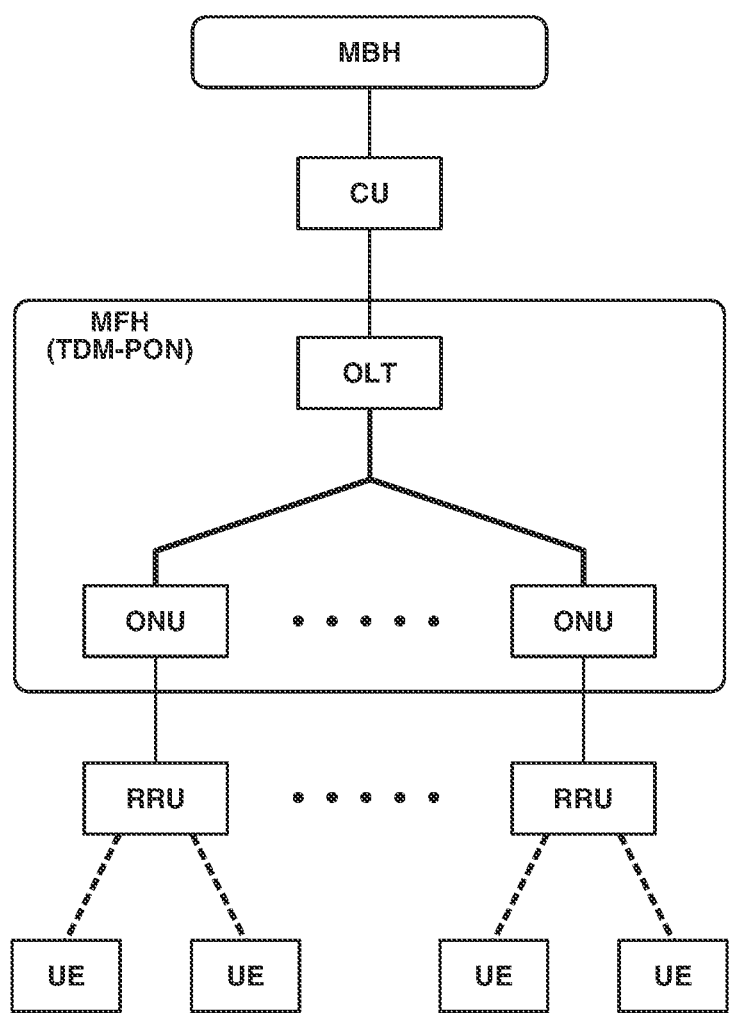
FIG. 16 shows an example of the arrangement of a general wireless network system.

FIG. 15 shows an example of an arrangement in a case in which an ONU 20 uses two optical signals of the different wavelengths $\lambda X$ and $\lambda Y$. A PON possessing circuit 20X has a function of performing optical commendation using the optical signal of the wavelength $\lambda X$, and a PON possessing circuit 20Y has a function of performing optical commendation using the optical signal of the wavelength $\lambda Y$.

Each of the PON possessing circuits 20X and 20Y includes a priority control circuit 21, an encryption/decryption processing circuit 23, an error correction processing circuit 24, a priority control bypass circuit 26, and an encryption/decryption bypass circuit 27. In addition, a PON protocol processing circuit 22 and a PON optical transmission/reception processing circuit 25 are provided commonly to the PON possessing circuits 20X and 20Y.

Accordingly, when transmitting/receiving control data by the PON protocol processing circuit 12 or 22, any of the wavelengths $\lambda X$ and $\lambda Y$ can be selected. On the other hand, as for the presence/absence of bypass of priority control processing and encryption/decryption processing, designations are separately made for the wavelengths $\lambda X$ and $\lambda Y$ by priority control bypass instructions BPX and BPY and encryption/decryption bypass instructions BEX and BEY. Hence, when a wavelength for which the encryption/decryption processing is not bypassed is selected to transmit/receive control data, the encryption/decryption processing of the control data can be performed.

The PON protocol processing circuit 12 of the OLT 10 according to this embodiment has a function of selecting a wavelength for which the encryption/decryption processing is not bypassed based on the encryption/decryption bypass instructions BEX and BEY concerning the PON possessing circuits 10X and 10Y and transmitting/receiving control data using the selected wavelength and a corresponding one of the PON possessing circuits 10X and 10Y.

In addition, the PON protocol processing circuit 22 of the ONU 20 according to this embodiment has a function of selecting a wavelength for which the encryption/decryption processing is not bypassed based on the encryption/decryption bypass instructions BEX and BEY concerning the PON possessing circuits 20X and 20Y and transmitting/receiving control data using the selected wavelength and a corresponding one of the PON possessing circuits 20X and 20Y.

Operation of Seventh Embodiment

The operation of a PON system 2 according to this embodiment will be described next with reference to FIGS. 14 and 15. The operations of the OLT 10 and the ONU 20 will be described here for each combination of bypass for encryption/decryption processing and priority control processing. A case of using the OMCC defined by ITU-T G989.3 (NG-PON2) as the PON protocol will be described below as an example.

Wavelengths Used to Transmit/Receive Control Data
[Case of Bypassing Neither Encryption/Decryption Processing Nor Priority Control Processing]
OLT: Uplink Direction In the OLT 10, the PON protocol processing circuit 12 receives uplink data and uplink control data from the encryption/decryption processing circuit 13. Of these data, the uplink control data is output to a PON control circuit 19, and uplink data other than the uplink control data is output to the host device (CU) side. Accordingly, the uplink data other than the uplink control data is output from the OLT 10 to the host device side via the priority control circuit 11.

OLT: Downlink Direction

In the OLT 10, the PON protocol processing circuit 12 acquires downlink data from the priority control circuit 11 and downlink control data output from the PON control circuit 19, inserts them into an FS payload, and outputs it to the PON side. Accordingly, the downlink data from the priority control circuit 11 and the downlink control data are stored in the FS payload and output to the error correction processing circuit 14 via the encryption/decryption processing circuit 13.

When inserting the data into the FS payload, data of a higher priority needs to be preferentially inserted in consideration of the priority of the data. For this purpose, a buffer for each priority is provided in the PON protocol processing circuit 12, and priority is given to the output (insertion into the FS payload) from a buffer of a higher priority. Alternatively, a buffer for downlink control data on a priority basis and a function of permitting the priority control circuit 11 to do output are provided in the PON protocol processing circuit 12, thereby permitting the priority control circuit 11 to do output only when inserting the downlink data from the priority control circuit 11.

In the former case, the downlink data from the priority control circuit 11 and the downlink control data are stored in the same buffer in accordance with the priority. Alternatively, a buffer for the downlink data from the priority control circuit 11 and a buffer for the downlink control data are separately provided on a priority basis, and if the priority of the downlink data from the priority control circuit 11 and the priority of the downlink control data are the same, the data are, for example, alternately inserted into the FS payload.

In the latter case, the PON protocol processing circuit 12 decides, based on a setting or the like, for example, which one of the downlink data from the priority control circuit 11 and the downlink control data should be inserted at which frequency. When inserting the downlink control data into the FS payload, the downlink control data is inserted from the buffer for downlink control data in the PON protocol processing circuit 12 in accordance with the priority. When inserting the downlink data from the priority control circuit 11 into the FS payload, a buffer for each priority in the priority control circuit 11 is used, and when the priority control circuit 11 receives an output permission input from the PON protocol processing circuit 12, the output from a buffer of a higher priority is preferentially output.

Note that in both the former case and the latter case, the insertion of the downlink control data into the FS payload may be given higher priority than the insertion of the downlink data from the priority control circuit 11.

ONU: Uplink Direction

In the ONU 20, the PON protocol processing circuit 22 acquires uplink data from the priority control circuit 21 and uplink control data output from a PON control circuit 29, inserts the uplink data from the priority control circuit 21 having the same Allocation-ID and the uplink control data into the same FS payload, and outputs it to the PON side.

When inserting the data into the FS payload, data of a higher priority needs to be preferentially inserted in consideration of the priority of the data. For this purpose, a buffer for each priority is provided in the PON protocol processing circuit 22 for each Allocation-ID, and priority is given to the output (insertion into the FS payload) from a buffer of a higher priority. Alternatively, a buffer for uplink control data on a priority basis and a function of permitting the priority control circuit 21 to do output (and a function of outputting the information of Allocation-ID permitted to output) are provided in the PON protocol processing circuit 22, thereby permitting the priority control circuit 21 to do output only when inserting the uplink data from the priority control circuit 21.

In the former case, the uplink data from the priority control circuit 21 and the uplink control data are stored in the same buffer in accordance with the priority. Alternatively, a buffer for the uplink data from the priority control circuit 21 and a buffer for the uplink control data are separately provided on a priority basis, and if the priority of the uplink data from the priority control circuit 21 and the priority of the uplink control data are the same, the data are, for example, alternately inserted into the FS payload.

In the latter case, the PON protocol processing circuit 22 decides, based on a setting or the like, for example, which one of the uplink data from the priority control circuit 21 and the uplink control data should be inserted at which frequency. When inserting the uplink control data into the FS payload, the uplink control data is inserted from the buffer for uplink control data in the PON protocol processing circuit 22 in accordance with the priority. When inserting the uplink data from the priority control circuit 21 into the FS payload, a buffer for each priority is provided in the priority control circuit 21 for each Allocation-ID, and when the priority control circuit 21 receives an output permission (and the information of permitted Allocation-ID) input from the PON protocol processing circuit 22, the output from a buffer of a higher priority of the permitted Allocation-ID is preferentially output.

Note that in both the former case and the latter case, when selectively using the Allocation-ID for each priority, the buffer for each priority need not be provided for each Allocation-ID, and the data to be inserted into the FS payload (the data to be output from the priority control circuit 21 in the latter case) can be decided based on only the Allocation-ID.

Additionally, in both the former case and the latter case, the insertion of the uplink control data into the FS payload may be given higher priority than the insertion of the uplink data from the priority control circuit 21.

ONU: Downlink Direction

In the ONU 20, the PON protocol processing circuit 22 receives downlink data and downlink control data from the encryption/decryption processing circuit 23. Of these data, the downlink control data is output to the PON control circuit 29, and downlink data other than the downlink control data is output to the user terminal side. Accordingly, the downlink data other than the downlink control data is output from the ONU 200 to the user terminal side via the priority control circuit 21.

[Case of Bypassing Only Priority Control Processing]

OLT: Uplink Direction

In the OLT 10, the PON protocol processing circuit 12 receives uplink data and uplink control data from the encryption/decryption processing circuit 13. Of these data, the uplink control data is output to a PON control circuit 19, and uplink data other than the uplink control data is output to the host device (CU) side. Accordingly, the uplink data other than the uplink control data is output from the OLT 10 to the host device side via the priority control bypass circuit 16.

OLT: Downlink Direction

In the OLT 10, the PON protocol processing circuit 12 acquires downlink data from the priority control bypass circuit 16 and downlink control data output from the PON control circuit 19, inserts them into an FS payload, and outputs it to the PON side. Accordingly, the downlink data from the priority control bypass circuit 16 and the downlink control data are stored in the FS payload and output to the error correction processing circuit 14 via the encryption/decryption processing circuit 13.

Note that when inserting the downlink data from the priority control bypass circuit 16 into the FS payload, the priority of the data need not be taken into consideration. However, the insertion of the downlink control data into the FS payload and the insertion of the downlink data from the priority control bypass circuit 16 into the FS payload cannot be simultaneously performed. Hence, a buffer for the downlink data from the priority control bypass circuit 16 is provided in the PON protocol processing circuit 12. Alternatively, a function of permitting the priority control bypass circuit 16 to do output is provided in the PON protocol processing circuit 12, thereby permitting the priority control bypass circuit 16 to do output only when inserting the downlink data from the priority control bypass circuit 16.

In the former case, the downlink data from the priority control bypass circuit 16 and the downlink control data are stored in the same buffer. Alternatively, a buffer for the downlink data from the priority control bypass circuit 16 and a buffer for the downlink control data are separately provided, and the data are, for example, alternately inserted into the FS payload.

In the latter case, the PON protocol processing circuit 12 decides, based on a setting or the like, for example, which one of the downlink data from the priority control bypass circuit 16 and the downlink control data should be inserted at which frequency. When inserting the downlink control data into the FS payload, the downlink control data is inserted from the buffer for downlink control data in the PON protocol processing circuit 12. When inserting the downlink data from the priority control bypass circuit 16 into the FS payload, a buffer is provided in the priority control bypass circuit 16, and when the priority control bypass circuit 16 receives an output permission input from the PON protocol processing circuit 12, the data is output from the buffer.

Note that in both the former case and the latter case, the insertion of the downlink control data into the FS payload may be given higher priority than the insertion of the downlink data from the priority control bypass circuit 16.

ONU: Uplink Direction

In the ONU 20, the PON protocol processing circuit 22 acquires uplink data from the priority control bypass circuit 26 and uplink control data output from the PON control circuit 29, inserts the uplink data from the priority control bypass circuit 26 having the same Allocation-ID and the uplink control data into the same FS payload, and outputs it to the PON side.

Accordingly, the uplink data from the priority control bypass circuit 26 and the uplink control data are stored in the FS payload and output to the error correction processing circuit 24 via the encryption/decryption processing circuit 23.

Note that when inserting the uplink data from the priority control bypass circuit 26 into the FS payload, the priority of the data need not be taken into consideration. However, the insertion of the uplink control data into the FS payload and the insertion of the uplink data from the priority control bypass circuit 26 into the FS payload cannot be simultaneously performed. Hence, a buffer for the uplink data from the priority control bypass circuit 26 is provided in the PON protocol processing circuit 22 for each Allocation-ID. Alternatively, a function of permitting the priority control bypass circuit 26 to do output (and a function of outputting the information of Allocation-ID permitted to output) is provided in the PON protocol processing circuit 22, thereby permitting the priority control bypass circuit 26 to do output only when inserting the uplink data from the priority control bypass circuit 26.

In the former case, the uplink data from the priority control bypass circuit 26 and the uplink control data are stored in the same buffer for each Allocation-ID. Alternatively, a buffer for the uplink data from the priority control bypass circuit 26 and a buffer for the uplink control data are separately provided, and the data are, for example, alternately inserted into the FS payload.

In the latter case, the PON protocol processing circuit 22 decides, based on a setting or the like, for example, which one of the uplink data from the priority control bypass circuit 26 and the uplink control data should be inserted at which frequency. When inserting the uplink control data into the FS payload, the uplink control data is inserted from the buffer for uplink control data in the PON protocol processing circuit 22. When inserting the uplink data from the priority control bypass circuit 26 into the FS payload, a buffer is provided in the priority control bypass circuit 26 for each Allocation-ID, and when the priority control bypass circuit 26 receives an output permission (and the information of permitted Allocation-ID) input from the PON protocol processing circuit 22, the data is output from the buffer of the permitted Allocation-ID.

Note that in both the former case and the latter case, the insertion of the uplink control data into the FS payload may be given higher priority than the insertion of the uplink data from the priority control bypass circuit 26.

ONU: Downlink Direction

In the ONU 20, the PON protocol processing circuit 22 receives downlink data and downlink control data from the encryption/decryption processing circuit 23. Of these data, the downlink control data is output to the PON control circuit 29, and downlink data other than the downlink control data is output to the user terminal side. Accordingly, the downlink data other than the downlink control data is output from the ONU 20 to the user terminal side via the priority control bypass circuit 26.

Wavelengths not Used to Transmit/Receive Control Data

[Case of Bypassing Neither Encryption/Decryption Processing Nor Priority Control Processing]

OLT: Uplink Direction

In the OLT 10, the PON protocol processing circuit 12 receives uplink data from the encryption/decryption processing circuit 13, and outputs it from the OLT 10 to the host device side via the priority control circuit 11.

OLT: Downlink Direction

In the OLT 10, the PON protocol processing circuit 12 acquires downlink data from the priority control circuit 11, inserts it into an FS payload, and outputs it to the PON side. Accordingly, the downlink data from the priority control circuit 11 is stored in the FS payload and output to the error correction processing circuit 14 via the encryption/decryption processing circuit 13.

Note that since the insertion of the downlink control data into the FS payload is not performed, the PON protocol processing circuit 12 inserts the downlink data output from the priority control circuit 11 in the output order into the FS payload.

ONU: Uplink Direction

In the ONU 20, the PON protocol processing circuit 22 acquires uplink data from the priority control circuit 21, inserts the uplink data having the same Allocation-ID into the same FS payload, and outputs it to the PON side.

Note that since the insertion of the uplink control data into the FS payload is not performed, the PON protocol processing circuit 22 inserts the uplink data output from the priority control circuit 21 in the output order into the FS payload.

ONU: Downlink Direction

In the ONU 20, the PON protocol processing circuit 22 receives downlink data from the encryption/decryption processing circuit 23, and outputs it from the ONU 200 to the user terminal side via the priority control circuit 21.

[Case of Bypassing Only Priority Control Processing]

OLT: Uplink Direction

In the OLT 10, the PON protocol processing circuit 12 receives uplink data from the encryption/decryption processing circuit 13, and outputs it from the OLT 10 to the host device side via the priority control bypass circuit 16.

OLT: Downlink Direction

In the OLT 10, the PON protocol processing circuit 12 acquires downlink data from the priority control bypass circuit 16, inserts it into an FS payload, and outputs it to the PON side. Accordingly, the downlink data is stored in the FS payload and output to the error correction processing circuit 14 via the encryption/decryption processing circuit 13.

Note that since the insertion of the downlink control data into the FS payload is not performed, the PON protocol processing circuit 12 inserts the downlink data output from the priority control bypass circuit 16 in the output order into the FS payload.

ONU: Uplink Direction

In the ONU 20, the PON protocol processing circuit 22 acquires uplink data from the priority control bypass circuit 26, inserts the uplink data having the same Allocation-ID into the same FS payload, and outputs it to the PON side. Accordingly, the uplink data is output to the error correction processing circuit 24 via the encryption/decryption processing circuit 23.

Note that since the insertion of the uplink control data into the FS payload is not performed, the PON protocol processing circuit 22 inserts the uplink data output from the priority control bypass circuit 26 in the output order into the FS payload.

ONU: Downlink Direction

In the ONU 20, the PON protocol processing circuit 22 receives downlink data from the encryption/decryption processing circuit 23, and outputs it from the ONU 20 to the user terminal side via the priority control bypass circuit 26.

[Case of Bypassing Only Encryption/Decryption Processing]

OLT: Uplink Direction

In the OLT 10, the PON protocol processing circuit 12 receives uplink data from the encryption/decryption bypass circuit 17, and outputs it from the OLT 10 to the host device side via the priority control circuit 11.

OLT: Downlink Direction

In the OLT 10, the PON protocol processing circuit 12 acquires downlink data from the priority control circuit 11, inserts it into an FS payload, and outputs it to the error correction processing circuit 14 via the encryption/decryption bypass circuit 17.

Note that since the insertion of the downlink control data into the FS payload is not performed, the PON protocol processing circuit 12 inserts the downlink data output from the priority control circuit 11 in the output order into the FS payload.

ONU: Uplink Direction

In the ONU 20, the PON protocol processing circuit 22 acquires uplink data from the priority control circuit 21, inserts the uplink data having the same Allocation-ID into the same FS payload, and outputs it to the PON side. Accordingly, the uplink data is output to the error correction processing circuit 24 via the encryption/decryption bypass circuit 27.

Note that since the insertion of the uplink control data into the FS payload is not performed, the PON protocol processing circuit 22 inserts the uplink data output from the priority control circuit 21 in the output order into the FS payload.

ONU: Downlink Direction

In the ONU 20, the PON protocol processing circuit 22 receives downlink data from the encryption/decryption bypass circuit 27, and outputs it to the user terminal side.

[Case of Bypassing Both Encryption/Decryption Processing and Priority Control Processing]

OLT: Uplink Direction

In the OLT 10, the PON protocol processing circuit 12 receives uplink data from the encryption/decryption bypass circuit 17, and outputs it to the host device (CU) side. Accordingly, the uplink data is output from the OLT 10 to the host device side via the priority control bypass circuit 16.

OLT: Downlink Direction

In the OLT 10, the PON protocol processing circuit 12 acquires downlink data from the priority control bypass circuit 16, inserts it into an FS payload, and outputs it to the PON side. Accordingly, the downlink data is output to the error correction processing circuit 14 via the encryption/decryption bypass circuit 17.

Note that since the insertion of the downlink control data into the FS payload is not performed, the PON protocol processing circuit 12 inserts the downlink data output from the priority control bypass circuit 16 in the output order into the FS payload.

ONU: Uplink Direction

In the ONU 20, the PON protocol processing circuit 22 acquires uplink data from the priority control bypass circuit 26, and inserts the downlink data having the same Allocation-ID into the same FS payload, and outputs it to the PON side. Accordingly, the uplink data is output to the error correction processing circuit 24 via the encryption/decryption bypass circuit 27.

Note that since the insertion of the uplink control data into the FS payload is not performed, the PON protocol processing circuit 22 inserts the uplink data output from the priority control bypass circuit 26 in the output order into the FS payload.

ONU: Downlink Direction

In the ONU 20, the PON protocol processing circuit 22 receives downlink data from the encryption/decryption bypass circuit 27, and outputs it to the user terminal side. Accordingly, the downlink data is output from the ONU 20 to the user terminal side via the priority control bypass circuit 26.

Effect of Seventh Embodiment

As described above, in this embodiment, in the OLT 10, the set of the encryption/decryption processing circuit 13 and the encryption/decryption bypass circuit 17 is individually provided for each wavelength of the optical signal to be transmitted/received by the PON. In addition, the PON protocol processing circuit 12 is provided commonly to the wavelengths. The PON protocol processing circuit 12 exchanges control data using a wavelength for which the encryption/decryption processing is not bypassed by the encryption/decryption bypass circuit 17 in the wavelengths.

Additionally, in the ONU 20, the set of the encryption/decryption processing circuit 23 and the encryption/decryption bypass circuit 27 is individually provided for each wavelength of the optical signal to be transmitted/received by the PON. In addition, the PON protocol processing circuit 22 is provided commonly to the wavelengths. The PON protocol processing circuit 22 exchanges control data using a wavelength for which the encryption/decryption processing is not bypassed by the encryption/decryption bypass circuit 27 in the wavelengths.

This makes it possible to encrypt and transmit, or decrypt and receive control data using the wavelength for which the encryption/decryption processing is not bypassed.

On the other hand, a wavelength that is not used to transmit/receive control data can be used only for data between the CU and the RRU, and a processing delay can be reduced by bypassing the encryption/decryption processing or the like, as in the first embodiment.

Note that when the processing delay at the wavelength that is not used to transmit/receive control data in this embodiment is compared with the same bypass setting in the third embodiment, in the third embodiment, data between the CU and the RRU cannot be inserted into an FS payload during the period when the control data is inserted into the FS payload, and therefore, a wait time occurs. However, since the wait time does not occur at the wavelength that is not used to transmit/receive control data in this embodiment, the delay becomes small.

Note that a case in which the PON protocol processing circuits 12 and 22 select a wavelength for which the encryption/decryption processing is not bypassed as a wavelength for transmission/reception of control data based on the encryption/decryption bypass instructions BEX and BEY has been described above. However, the present invention is not limited to this. For example, for a wavelength selected in advance for transmission/reception of control data, the PON protocol processing circuits 12 and 22 may not bypass the encryption/decryption processing.

Extension of Embodiment

The present invention has been described above with reference to the exemplary embodiments. However, the present invention is not limited to the above exemplary embodiments. Various changes and modifications understandable by those who are skilled in the art can be done for the arrangements and details of the present invention without departing the scope of the present invention. In addition, the embodiments can arbitrarily be combined and implemented in a consistent range.

EXPLANATION OF THE REFERENCE NUMERALS AND SIGNS

1 . . . wireless network system, 2 . . . PON system, 10 . . . station side device (OLT), 11 . . . priority control circuit, 12 . . . PON protocol processing circuit, 13 . . . encryption/decryption processing circuit, 14 . . . error correction processing circuit, 15 . . . PON optical transmission/reception processing circuit, 16 . . . priority control bypass circuit, 16A . . . IF matching processing circuit, 16B, 16C . . . selector (SEL), 16D, 16E . . . bypass control circuit, 17 . . . encryption/decryption bypass circuit, 17A . . . IF matching processing circuit, 17B, 17C . . . selector (SEL), 17D, 17E . . . bypass control circuit, 18 . . . control encryption/decryption processing circuit, 19 . . . PON control circuit, 20 . . . subscriber side device (ONU), 21 . . . priority control circuit, 22 . . . PON protocol processing circuit, 23 . . . encryption/decryption processing circuit, 24 . . . error correction processing circuit, 25 . . . PON optical transmission/reception processing circuit, 26 . . . priority control bypass circuit, 26A . . . IF matching processing circuit, 26B, 26C . . . selector (SEL), 26D, 26E . . . bypass control circuit, 27 . . . encryption/decryption bypass circuit, 28 . . . control encryption/decryption processing circuit, 29 . . . PON control circuit, CU . . . central station, RRU . . . radio station, UE . . . user terminal, MFH . . . mobile fronthaul, MBH . . . mobile backhaul, BP, BPX, BPY . . . priority control bypass instruction, BE, BEX, BEY . . . encryption/decryption bypass instruction.

The invention claimed is:

1. A PON system including one OLT and a plurality of ONUs and configured to transfer data between the OLT and the plurality of ONUs via a PON, a PON device, which is at least either one of the OLT or each of the plurality of ONUs, comprising:
an encryption/decryption processing circuit configured to perform encryption/decryption processing for the data;
a priority control circuit configured to perform priority control processing for the data; and a bypass circuit configured to bypass at least one of the encryption/decryption processing circuit and the priority control circuit in accordance with a preset bypass instruction.

2. The PON system according to claim 1, wherein the bypass circuit comprises:
   an IF matching processing circuit configured to receive input data input to a target process as a target of the bypass and match an interface concerning the input data with non-bypass data obtained by applying the target process to the input data, thereby generating bypass data that has bypassed the target process; and
   a selector configured to switch and select one of the non-bypass data and the bypass data in accordance with the bypass instruction.

3. The PON system according to claim 2, further comprising a control encryption/decryption processing circuit configured to perform encryption/decryption processing for control data used for control of the PON system,
   wherein the PON device further comprises:
   an encryption/decryption bypass circuit serving as the bypass circuit and configured to bypass the encryption/decryption processing in accordance with the bypass instruction; and
   a PON protocol processing circuit connected between the encryption/decryption processing circuit and the priority control circuit and configured to exchange the data between the priority control circuit and the encryption/decryption processing circuit and also exchange the control data with the encryption/decryption processing circuit, and
   the control encryption/decryption processing circuit switches presence/absence of application of the encryption/decryption processing to the control data exchanged by the PON protocol processing circuit, in accordance with presence/absence of bypass of the encryption/decryption processing by the encryption/decryption bypass circuit.

4. The PON system according to claim 2, wherein the PON device further comprises:
   a priority control bypass circuit serving as the bypass circuit and configured to bypass the priority control processing in accordance with the bypass instruction; and
   a PON protocol processing circuit connected between the encryption/decryption processing circuit and the priority control circuit and configured to exchange the data between the priority control circuit and the encryption/decryption processing circuit and also exchange the control data used for control of the PON system with the encryption/decryption processing circuit, and
   the PON protocol processing circuit switches whether to execute, in the PON protocol processing circuit, control on a priority basis concerning the data to be output to the encryption/decryption processing circuit, in accordance with presence/absence of bypass of the priority control processing by the priority control bypass circuit.

5. The PON system according to claim 2, wherein the PON device further comprises:
   a priority control bypass circuit serving as the bypass circuit and configured to bypass the priority control processing in accordance with the bypass instruction; and
   a PON protocol processing circuit connected between the encryption/decryption processing circuit and the priority control circuit and configured to exchange the data between the priority control circuit and the encryption/decryption processing circuit and also exchange the control data used for control of the PON system with the encryption/decryption processing circuit, and
   the PON protocol processing circuit switches whether to output an output permission to the priority control bypass circuit or output the output permission to the priority control circuit, in accordance with presence/absence of bypass of the priority control processing by the priority control bypass circuit.

6. The PON system according to claim 2, wherein the PON device further comprises:
   a priority control bypass circuit serving as the bypass circuit and configured to bypass the priority control processing in accordance with the bypass instruction; and
   a PON protocol processing circuit connected between the encryption/decryption processing circuit and a side of the PON and configured to exchange the data between the encryption/decryption processing circuit and the side of the PON and also exchange the control data used for control of the PON system with the side of the PON, and
   the PON protocol processing circuit switches whether to execute, in the PON protocol processing circuit, control on a priority basis concerning the data to be output to the side of the PON, in accordance with presence/absence of bypass of the priority control processing by the priority control bypass circuit.

7. The PON system according to claim 2, wherein the PON device further comprises:
   a priority control bypass circuit serving as the bypass circuit and configured to bypass the priority control processing in accordance with the bypass instruction; and
   a PON protocol processing circuit connected between the encryption/decryption processing circuit and a side of the PON and configured to exchange the data between the encryption/decryption processing circuit and the side of the PON and also exchange the control data used for control of the PON system with the side of the PON, and
   the PON protocol processing circuit switches whether to output an output permission to the priority control bypass circuit or output the output permission to the priority control circuit, in accordance with presence/absence of bypass of the priority control processing by the priority control bypass circuit.

8. The PON system according to claim 2, wherein the PON device includes
   a set of the encryption/decryption processing circuit and the encryption/decryption bypass circuit provided for each wavelength of an optical signal transmitted/received by the PON, and
   a PON protocol processing circuit, provided commonly to the wavelengths, the PON protocol processing circuit being connected between the encryption/decryption processing circuit and the priority control circuit and configured to exchange the data between the priority control circuit and the encryption/decryption processing circuit and also exchange the control data used for control of the PON system with the encryption/decryption processing circuit, and
   the PON protocol processing circuit exchanges the control data using, of the wavelengths, a wavelength for which the encryption/decryption processing is not bypassed by the encryption/decryption bypass circuit.

9. A wireless network system including one central station and one or a plurality of radio stations configured to perform wireless communication with one or a plurality of user terminals accommodated under the radio stations and configured to divisionally execute a plurality of wireless protocol processes between the central station and the radio station, wherein
a mobile fronthaul configured to transfer data transmitted/received by the user terminal between the central station and the radio station comprises a PON system of claim 2.

10. The PON system according to claim 1, further comprising a control encryption/decryption processing circuit configured to perform encryption/decryption processing for control data used for control of the PON system,
wherein the PON device further comprises:
an encryption/decryption bypass circuit serving as the bypass circuit and configured to bypass the encryption/decryption processing in accordance with the bypass instruction; and
a PON protocol processing circuit connected between the encryption/decryption processing circuit and the priority control circuit and configured to exchange the data between the priority control circuit and the encryption/decryption processing circuit and also exchange the control data with the encryption/decryption processing circuit, and
the control encryption/decryption processing circuit switches presence/absence of application of the encryption/decryption processing to the control data exchanged by the PON protocol processing circuit, in accordance with presence/absence of bypass of the encryption/decryption processing by the encryption/decryption bypass circuit.

11. The PON system according to claim 1, wherein the PON device further comprises:
a priority control bypass circuit serving as the bypass circuit and configured to bypass the priority control processing in accordance with the bypass instruction; and
a PON protocol processing circuit connected between the encryption/decryption processing circuit and the priority control circuit and configured to exchange the data between the priority control circuit and the encryption/decryption processing circuit and also exchange the control data used for control of the PON system with the encryption/decryption processing circuit, and
the PON protocol processing circuit switches whether to execute, in the PON protocol processing circuit, control on a priority basis concerning the data to be output to the encryption/decryption processing circuit, in accordance with presence/absence of bypass of the priority control processing by the priority control bypass circuit.

12. The PON system according to claim 1, wherein the PON device further comprises:
a priority control bypass circuit serving as the bypass circuit and configured to bypass the priority control processing in accordance with the bypass instruction; and
a PON protocol processing circuit connected between the encryption/decryption processing circuit and the priority control circuit and configured to exchange the data between the priority control circuit and the encryption/decryption processing circuit and also exchange the control data used for control of the PON system with the encryption/decryption processing circuit, and the PON protocol processing circuit switches whether to output an output permission to the priority control bypass circuit or output the output permission to the priority control circuit, in accordance with presence/absence of bypass of the priority control processing by the priority control bypass circuit.

13. The PON system according to claim 1, wherein the PON device further comprises:
a priority control bypass circuit serving as the bypass circuit and configured to bypass the priority control processing in accordance with the bypass instruction; and
a PON protocol processing circuit connected between the encryption/decryption processing circuit and a side of the PON and configured to exchange the data between the encryption/decryption processing circuit and the side of the PON and also exchange the control data used for control of the PON system with the side of the PON, and
the PON protocol processing circuit switches whether to execute, in the PON protocol processing circuit, control on a priority basis concerning the data to be output to the side of the PON, in accordance with presence/absence of bypass of the priority control processing by the priority control bypass circuit.

14. The PON system according to claim 1, wherein the PON device further comprises:
a priority control bypass circuit serving as the bypass circuit and configured to bypass the priority control processing in accordance with the bypass instruction; and
a PON protocol processing circuit connected between the encryption/decryption processing circuit and a side of the PON and configured to exchange the data between the encryption/decryption processing circuit and the side of the PON and also exchange the control data used for control of the PON system with the side of the PON, and
the PON protocol processing circuit switches whether to output an output permission to the priority control bypass circuit or output the output permission to the priority control circuit, in accordance with presence/absence of bypass of the priority control processing by the priority control bypass circuit.

15. The PON system according to claim 1, wherein the PON device includes:
a set of the encryption/decryption processing circuit and the encryption/decryption bypass circuit provided for each wavelength of an optical signal transmitted/received by the PON, and
a PON protocol processing circuit, provided commonly to the wavelengths, the PON protocol processing circuit being connected between the encryption/decryption processing circuit and the priority control circuit and configured to exchange the data between the priority control circuit and the encryption/decryption processing circuit and also exchange the control data used for control of the PON system with the encryption/decryption processing circuit, and
the PON protocol processing circuit exchanges the control data using, of the wavelengths, a wavelength for which the encryption/decryption processing is not bypassed by the encryption/decryption bypass circuit.

16. A wireless network system including one central station and one or a plurality of radio stations configured to perform wireless communication with one or a plurality of user terminals accommodated under the radio stations and configured to divisionally execute a plurality of wireless protocol processes between the central station and the radio station, wherein
    a mobile fronthaul configured to transfer data transmitted/received by the user terminal between the central station and the radio station comprises a PON system of claim 1.

17. The wireless network system according to claim 16, wherein a bypass circuit of the PON system further comprises a bypass control circuit configured to identify, based on control information included in the data, a division point position of the wireless protocol processes divided in advance between the central station and the radio station and generate a bypass instruction in accordance with the obtained division point position.

18. An OLT used in a PON system of claim 1.

19. An ONU used in a PON system of claim 1.

20. A data transfer method used by a PON system including one OLT and a plurality of ONUs and configured to transfer data between the OLT and the plurality of ONUs via a PON,
    a PON device, which is at least either one of the OLT or each of the plurality of ONUs, comprises:
    an encryption/decryption processing step of performing encryption/decryption processing for the data;
    a priority control step of performing priority control processing for the data; and
    a bypass processing step of bypassing at least one of the encryption/decryption processing circuit and the priority control circuit in accordance with a preset bypass instruction.

* * * * *